(12) United States Patent
Geng et al.

(10) Patent No.: US 10,993,134 B2
(45) Date of Patent: Apr. 27, 2021

(54) RADIO RESOURCE MEASUREMENT METHOD, RADIO RESOURCE SELECTION METHOD, AND APPARATUS

(71) Applicant: Huawei Technologies Co., Ltd., Shenzhen (CN)

(72) Inventors: Tingting Geng, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/368,559

(22) Filed: Mar. 28, 2019

(65) Prior Publication Data

US 2019/0223043 A1    Jul. 18, 2019

Related U.S. Application Data

(63) Continuation of application No. PCT/CN2017/103985, filed on Sep. 28, 2017.

(30) Foreign Application Priority Data

Sep. 29, 2016  (CN) .......................... 2016 1 0870478
Dec. 30, 2016  (CN) .......................... 2016 1 1264181

(51) Int. Cl.
*H04W 24/10* (2009.01)
*H04W 72/04* (2009.01)
(Continued)

(52) U.S. Cl.
CPC .......... *H04W 24/10* (2013.01); *H04B 7/0695* (2013.01); *H04L 5/0051* (2013.01);
(Continued)

(58) Field of Classification Search
None
See application file for complete search history.

(56) References Cited

U.S. PATENT DOCUMENTS

| | | | |
|---|---|---|---|
| 6,539,227 B1 | 3/2003 | Jetzek et al. | |
| 10,470,064 B2 * | 11/2019 | Davydov | .............. H04L 5/0048 |

(Continued)

FOREIGN PATENT DOCUMENTS

| | | |
|---|---|---|
| CN | 103765794 A | 4/2014 |
| CN | 105007126 A | 10/2015 |

(Continued)

OTHER PUBLICATIONS

Samsung, "Discussion on Beam Measurement and Tracking for 5G New Radio Interface in mmWave Frequency Bands", 3GPP TSG RAN WG2 #93bis R2-162226, Apr. 11-15, 2016, Dubrovnik, Croatia, 5 pages.

(Continued)

*Primary Examiner* — Otis L Thompson, Jr.
(74) *Attorney, Agent, or Firm* — Slater Matsil, LLP

(57) ABSTRACT

This application discloses a radio resource measurement method, a radio resource selection method, and an apparatus. A terminal obtains a measurement result of a beam; and the terminal sends, to a network device, first indication information used to instruct to deactivate or delete a beam, where the beam satisfies a first quality condition. In addition, the terminal may further obtain a measurement result of the beam, and send, to the network device, second indication information used to instruct to activate or add the beam, to instruct the network device to activate or add a beam having relatively good communication quality, for communication with the terminal.

16 Claims, 11 Drawing Sheets

(51) Int. Cl.
  *H04W 36/00* (2009.01)
  *H04B 7/06* (2006.01)
  *H04W 76/27* (2018.01)
  *H04W 36/30* (2009.01)
  *H04L 5/00* (2006.01)
  *H04W 16/28* (2009.01)
  *H04W 24/02* (2009.01)

(52) U.S. Cl.
  CPC ....... *H04L 5/0057* (2013.01); *H04W 36/0085* (2018.08); *H04W 36/305* (2018.08); *H04W 72/046* (2013.01); *H04W 76/27* (2018.02); *H04W 16/28* (2013.01); *H04W 24/02* (2013.01)

(56) References Cited

U.S. PATENT DOCUMENTS

| | | |
|---|---|---|
| 2013/0059619 A1 | 3/2013 | Kim et al. |
| 2016/0150435 A1 | 5/2016 | Baek et al. |
| 2017/0033856 A1 | 2/2017 | Su et al. |
| 2017/0195027 A1 | 7/2017 | Baek et al. |
| 2017/0208494 A1* | 7/2017 | Moon ................... H04L 5/0048 |
| 2017/0346543 A1* | 11/2017 | Islam ................... H04B 7/0634 |
| 2019/0089447 A1* | 3/2019 | Sang ..................... H04W 40/16 |
| 2020/0281477 A1* | 9/2020 | Islam ........................ G01J 3/42 |

FOREIGN PATENT DOCUMENTS

| | | |
|---|---|---|
| KR | 20130025102 A | 3/2013 |
| KR | 20160063020 A | 6/2016 |
| WO | 2016018121 A1 | 2/2016 |
| WO | 2016086144 A1 | 6/2016 |

OTHER PUBLICATIONS

Ericsson, "Active Mode Mobility in NR: SINR drops in higher frequencies", 3GPP TSG-RAN WG2 #93bis Tdoc R2-162762, Apr. 11-15, 2016, Dubrovnik, Croatia, 4 pages.

ZTE Coporation, ZTE Microelectronics, "Consideration on the Measurement for the NR", 3GPP TSG-RAN WG2 Meeting #95 R2-165119, Aug. 22-26, 2016, Göteborg, Sweden, 4 pages.

RLM and RLF in HF NR [online], 3GPP TSG-RAN WG2#95 R2-164899, Aug. 26, 2016, 4 pages.

\* cited by examiner

US 10,993,134 B2

RADIO RESOURCE MEASUREMENT METHOD, RADIO RESOURCE SELECTION METHOD, AND APPARATUS

CROSS-REFERENCE TO RELATED APPLICATIONS

This application is a continuation of International Application No. PCT/CN2017/103985, filed on Sep. 28, 2017, which claims priority to Chinese Patent Application No. 201610870478.9, filed on Sep. 29, 2016, and to Chinese Patent Application No. 201611264181.4, filed on Dec. 30, 2016. The disclosures of the aforementioned applications are hereby incorporated by reference in their entireties.

TECHNICAL FIELD

Embodiments of this application relate to the field of communications technologies, and in particular, to a radio resource measurement method, a radio resource selection method, and an apparatus.

BACKGROUND

As mobile communications technologies are developing towards a high speed, a large data service volume, and the like, there are increasing requirements on spectrums during communication and transmission. A high-band spectrum has a large amount of available bandwidth, and therefore becomes an important resource meeting high-capacity and high-bandwidth requirements in future communication, and will also become a further evolved target spectrum in a 5G communications technology, the 3rd Generation Partnership Project (3GPP), and a Long Term Evolution Advanced (LTE-A) system. The high-band spectrum includes a centimeter wave band and a millimeter wave band. The centimeter wave band is generally a spectrum within a range of 3 GHz to 30 GHz, and the millimeter wave band is generally a spectrum within a range of 30 GHz to 300 GHz.

Cellular communication to which a high-band wave is applied is referred to as high-frequency cellular communication, and an area covered by a beam signal in high-frequency cellular communication is referred to as a high-frequency cell. Generally, a high-frequency cell has relatively small coverage, a beam signal is easily blocked, and a handover rate and a handover failure rate of a terminal (user equipment, UE) in a high-frequency cellular environment are much greater than those in a low-frequency cell. In addition, a relatively high handover failure rate causes a user communication interruption and a delay, and results in severe deterioration in service quality (Quality of Service, QoS) of a service and user experience. Therefore, in high-frequency cellular communication, it is challenging to perform mobility management on the UE.

In a related technology, in a process of performing mobility management on UE, an important manner for helping a base station perform handover decision is performing radio resource management (RRM) measurement by UE and reporting a measurement result to the base station. For example, RRM measurement in an existing LTE technology is based on an omnidirectionally sent cell-specific reference signal (CRS) or channel state information-reference signal (CSI-RS). The UE measures a reference signal in a serving cell, an intra-frequency neighboring cell, or an inter-frequency neighboring cell, performs Layer 3 smooth filtering and averaging on a measurement result within a particular time, and reports the measurement result to the base station, so that the base station determines whether to perform a handover and select a target cell. However, during high-frequency cellular communication, to compensate for a path loss of a high-band wave, communication coverage quality of the high-frequency cellular communication needs to be improved by using a technology such as beamforming. In practice, when a reference signal used for RRM measurement is sent in a form of a beam, the reference signal cannot be measured in an RRM measurement manner in the prior art. In addition, because a high-frequency signal features relatively low penetrability, fast attenuation of signal quality when encountering an obstruction, and the like, once the high-frequency signal for communication between the UE and the base station deteriorates, it is very likely to affect normal communication between the UE and the base station.

SUMMARY

To improve communication quality, this application provides a radio resource measurement method, a radio resource selection method, and an apparatus.

According to an aspect provided in embodiments of this application, a radio resource selection method is provided. The method includes: obtaining, by a terminal, a measurement result of a beam; and sending, by the terminal, first indication information to a network device, where the first indication information is used to instruct to deactivate or delete the beam, and the measurement result of the beam satisfies a first quality condition.

In a possible design manner, the sending, by the terminal, first indication information to the network device includes: sending, by the terminal, the first indication information to the network device by using the beam.

In a possible design manner, the first indication information includes: deactivation indication information or deletion indication information; identifier information of the beam; or quality information of the beam.

In a possible design manner, the sending, by the terminal, first indication information to the network device includes: sending, by the terminal, the first indication information to the network device by using a beam other than the beam.

In a possible design manner, the first indication information includes identifier information of the beam.

In a possible design manner, the first indication information further includes: deactivation indication information or deletion indication information; or quality information of the beam.

In a possible design manner, the method further includes: stopping, by the terminal, monitoring the beam.

In a possible design manner, the method further includes: receiving, by the terminal, feedback information of the first indication information from the network device.

In another embodiment provided in this application, a radio resource selection method is further provided. The method includes: obtaining, by a terminal, a measurement result of a beam; and sending, by the terminal, second indication information to a network device, where the second indication information is used to instruct to activate or add the beam, and the measurement result of the beam satisfies a second quality condition.

In a possible design manner, the sending, by the terminal, second indication information to the network device includes: sending, by the terminal, the second indication information to the network device by using a beam other than the beam.

In a possible design manner, the second indication information includes identifier information of the beam.

In a possible design manner, the second indication information further includes: activation indication information or addition indication information; or quality information of the beam.

In a possible design manner, the method further includes: monitoring, by the terminal, the beam.

In a possible design manner, the method further includes: receiving, by the terminal, feedback information of the second indication information from the network device.

In another embodiment provided in this application, a terminal is further provided. The terminal includes: a processor, configured to obtain a measurement result of a beam; and a transmitter, configured to send first indication information to a network device, where the first indication information is used to instruct to deactivate or delete the beam, and the measurement result of the beam satisfies a first quality condition.

In a possible design manner, the transmitter is further configured to send the first indication information to the network device by using the beam.

In a possible design manner, the first indication information includes: deactivation indication information or deletion indication information; identifier information of the beam; or quality information of the beam.

In a possible design manner, the transmitter is further configured to send the first indication information to the network device by using a beam other than the beam.

In a possible design manner, the first indication information includes identifier information of the beam.

In a possible design manner, the first indication information further includes: deactivation indication information or deletion indication information; or quality information of the beam.

In a possible design manner, the processor is further configured to stop monitoring the beam.

In a possible design manner, the terminal further includes a receiver, where the receiver is configured to receive feedback information of the first indication information from the network device.

In another embodiment provided in this application, a terminal is further provided. The terminal includes: a processor, configured to obtain a measurement result of a beam; and a transmitter, configured to send second indication information to a network device, where the second indication information is used to instruct to activate or add the beam, and the measurement result of the beam satisfies a second quality condition.

In a possible design manner, the transmitter is further configured to send the second indication information to the network device by using a beam other than the beam.

In a possible design manner, the second indication information includes identifier information of the beam.

In a possible design manner, the second indication information further includes: activation indication information or addition indication information; or quality information of the beam.

In a possible design manner, the processor is further configured to monitor the beam.

In a possible design manner, the terminal further includes a receiver, where the receiver is further configured to receive feedback information of the second indication information from the network device.

In another embodiment provided in this application, a radio resource selection method is further provided. The method includes: receiving, by a network device, first indication information sent by a terminal, where the first indication information is used to instruct to deactivate or delete a beam; and deactivating or deleting, by the network device, the beam.

In a possible design manner, the receiving, by a network device, first indication information sent by a terminal includes: receiving, by the network device by using the beam, the first indication information sent by the terminal.

In a possible design manner, the first indication information includes: deactivation indication information or deletion indication information; or identifier information of the beam; or quality information of the beam.

In a possible design manner, the first indication information further includes identifier information of the beam.

In a possible design manner, the receiving, by a network device, first indication information sent by a terminal includes: receiving, by the network device by using a beam other than the beam, the first indication information sent by the terminal.

In a possible design manner, the first indication information includes identifier information of the beam.

In a possible design manner, the first indication information further includes: deactivation indication information or deletion indication information; or quality information of the beam.

In a possible design manner, the method further includes: sending, by the network device, feedback information of the first indication information to the terminal.

In another embodiment provided in this application, a radio resource selection method is further provided. The method includes: receiving, by a network device, second indication information sent by a terminal, where the second indication information is used to instruct to activate or add a beam; and activating or adding, by the network device, the beam.

In a possible design manner, the receiving, by a network device, second indication information sent by a terminal includes: receiving, by the network device by using a beam other than the beam, the second indication information sent by the terminal.

In a possible design manner, the second indication information includes identifier information of the beam.

In a possible design manner, the second indication information further includes: activation indication information or addition indication information; or quality information of the beam.

In a possible design manner, the method further includes: sending, by the network device, feedback information of the second indication information to the terminal.

In another embodiment provided in this application, a network device is further provided. The network device includes: a communications interface, configured to receive first indication information sent by a terminal, where the first indication information is used to instruct to deactivate or delete a beam; and a processor, configured to deactivate or delete the beam.

In a possible design manner, the communications interface is further configured to receive, by using the beam, the first indication information sent by the terminal.

In a possible design manner, the first indication information includes: deactivation indication information or deletion indication information; or identifier information of the beam; or quality information of the beam.

In a possible design manner, the communications interface is further configured to receive, by using a beam other than the beam, the first indication information sent by the terminal.

In a possible design manner, the first indication information includes identifier information of the beam.

In a possible design manner, the first indication information further includes: deactivation indication information or deletion indication information; or quality information of the beam.

In a possible design manner, the communications interface is further configured to send feedback information of the first indication information to the terminal.

In another embodiment provided in this application, a network device is further provided. The network device includes: a communications interface, configured to receive second indication information sent by a terminal, where the second indication information is used to instruct to activate or add a beam; and a processor, configured to activate or add the beam.

In a possible design manner, the communications interface is further configured to receive, by using a beam other than the beam, the second indication information sent by the terminal.

In a possible design manner, the second indication information includes identifier information of the beam.

In a possible design manner, the second indication information further includes: activation indication information or addition indication information; or quality information of the beam.

In a possible design manner, the communications interface is further configured to send feedback information of the second indication information to the terminal.

It should be noted that, a beam in the embodiments of this application is a spatial resource for performing communication by using a high-frequency signal, and a solution applicable to another spatial resource can be obtained by simply replacing a beam in the embodiments of this application with another spatial resource. For example, a port or a port set is also a spatial resource.

According to the radio resource selection method provided in the embodiments of this application, the terminal reports a beam that does not meet a communication quality requirement, and the network device may deactivate or delete the beam that does not meet the communication quality requirement, so that the terminal can communicate with a network side by using a beam having relatively good communication quality, thereby improving communication efficiency. On the other hand, the terminal reports a beam meeting a communication quality requirement, and the network device may activate or add the beam meeting the communication quality requirement, so that the terminal can communicate with a network side by using a beam having relatively good communication quality, thereby improving communication efficiency.

According to another aspect of the embodiments of this application, a radio resource measurement method is provided. The method includes: obtaining, by a terminal, first measurement configuration information; obtaining, by the terminal, beam reference signals sent by one or more base stations; measuring, by the terminal, the beam reference signals based on the first measurement configuration information, to obtain measurement values of the beam reference signals; and performing filtering, by the terminal, on the measurement values of the beam reference signals, to obtain a measurement result, where the measurement result include a cell measurement result and/or a beam measurement result.

The terminal measures and perform filtering on the beam reference signal that is sent in a form of a beam by the base station, thereby greatly reducing signaling overheads of the terminal and the base station, avoiding a problem of a user communication interruption that is caused by a relatively high handover failure rate of the terminal, and further reducing a communication delay between the terminal and the base station.

Optionally, the beam reference signals are beam reference signals in a same cell obtained by the terminal, or the beam reference signals are beam reference signals in different cells obtained by the terminal; and the performing filtering, by the terminal, on the measurement values of the beam reference signals includes: obtaining, by the terminal, measurement values respectively corresponding to a plurality of beam reference signals that are measured within a preset time range; and processing, by the terminal, the measurement values of the plurality of beam reference signals in a preset manner, to obtain the measurement result.

The terminal may obtain one beam reference signal at a moment, or the terminal may obtain a plurality of beam reference signals at a same moment. At a plurality of moments within a preset period of time, the terminal may obtain beam reference signals in a same cell, or may obtain beam reference signals sent in different cells; and the terminal measures the obtained beam reference signals, to respectively obtain measurement values, and then performs filtering on the measurement values, to obtain the measurement result.

Optionally, when the terminal obtains one beam reference signal at a moment, and the terminal obtains a plurality of beam reference signals at different moments, the performing filtering, by the terminal, on the measurement values of the beam reference signals includes: obtaining, by the terminal, measurement values respectively corresponding to the plurality of beam reference signals within a first preset time range; and processing, by the terminal in a first preset manner, the measurement values respectively corresponding to the plurality of beam reference signals within the first preset time range, to obtain a first measurement result of the plurality of beam reference signals, and using the first measurement result as the cell measurement result.

Optionally, when the terminal obtains one beam reference signal at a moment, and the terminal obtains a plurality of different beam reference signals at different moments, the performing filtering, by the terminal, on the measurement values of the beam reference signals includes: obtaining, by the terminal, measurement values respectively corresponding to the plurality of different beam reference signals within a second preset time range; and processing, by the terminal in a second preset manner, a measurement value corresponding to each category of beam reference signals in the plurality of different beam reference signals within the second preset time range, to obtain a second measurement result of the plurality of different beam reference signals, and using the second measurement result as the beam measurement result.

Optionally, when the terminal obtains a plurality of beam reference signals at a same moment, and the terminal obtains a plurality of different beam reference signals at different moments, the performing filtering, by the terminal, on the measurement values of the beam reference signals includes: obtaining, by the terminal, measurement values respectively corresponding to the plurality of beam reference signals obtained at the same moment; averaging, by the terminal, the measurement values respectively corresponding to the plurality of beam reference signals obtained at the same moment, to obtain an average measurement value of the plurality of beam reference signals obtained at the same moment; obtaining, by the terminal, average measurement values respectively corresponding to different moments within a third preset time range; and processing, by the terminal in a third preset manner, the average measurement values respectively corresponding to the different moments within the third preset time range, to obtain a third measurement result, and using the third measurement result as the cell measurement result.

Optionally, when the terminal obtains a plurality of beam reference signals at a same moment, and the terminal obtains a plurality of different beam reference signals at different moments, the performing filtering, by the terminal, on the measurement values of the beam reference signals includes: obtaining, by the terminal, a measurement value of each of the plurality of different beam reference signals; obtaining, by the terminal, a maximum measurement value of the plurality of different beam reference signals at the same moment; obtaining, by the terminal, maximum measurement values respectively corresponding to different moments within a fourth preset time range; and processing, by the terminal in a fourth preset manner, the maximum measurement values corresponding to the different moments within the fourth preset time range, to obtain a fourth measurement result, and using the fourth measurement result as the cell measurement result; or processing, by the terminal in a fifth preset manner, the maximum measurement values corresponding to the different moments within the fourth preset time range, to obtain a fifth measurement result, and using the fifth measurement result as the beam measurement result.

Optionally, when the terminal obtains one or more beam reference signals at a same moment, and the terminal obtains a plurality of beam reference signals at different moments, the performing filtering, by the terminal, on the measurement values of the beam reference signals includes: obtaining, by the terminal, measurement values respectively corresponding to the plurality of beam reference signals within a fifth preset time range; averaging, by the terminal, measurement values respectively corresponding to the plurality of beam reference signals at the same moment, to obtain an average measurement value of the plurality of beam reference signals at the same moment; and processing, by the terminal in a sixth preset manner, average measurement values respectively corresponding to different moments within the fifth preset time range, to obtain a sixth measurement result, and using the sixth measurement result as the cell measurement result.

Optionally, when the terminal obtains one or more beam reference signals at a same moment, and the terminal receives a plurality of beam reference signals at different moments, the performing filtering, by the terminal, on the measurement values of the beam reference signals includes: obtaining, by the terminal, measurement values respectively corresponding to the plurality of beam reference signals within a sixth preset time range; obtaining, by the terminal, a maximum measurement value of the plurality of different beam reference signals at the same moment; and processing, by the terminal in a seventh preset manner, maximum measurement values corresponding to different moments within the sixth preset time range, to obtain a seventh measurement result, and using the seventh measurement result as the cell measurement result; or processing, by the terminal in an eighth preset manner, maximum measurement values corresponding to different moments within the sixth preset time range, to obtain an eighth measurement result, and using the eighth measurement result as the beam measurement result.

Optionally, the terminal obtains measurement results of a plurality of beam reference signals in a same cell or different cells; and the cell measurement result includes a serving cell measurement result and/or a neighboring cell measurement result.

Optionally, the method further includes: obtaining, by the terminal, second measurement configuration information; determining, by the terminal, a beam reference signal measurement set of the beam reference signals based on the second measurement configuration information; and measuring, by the terminal, a beam reference signal in the beam reference signal measurement set, to determine a beam reference signal active set.

Optionally, the second measurement configuration information includes a first preset threshold; and the measuring, by the terminal, a beam reference signal in the beam reference signal measurement set, to determine a beam reference signal active set includes: measuring, by the terminal, the beam reference signal in the beam reference signal measurement set within a first preset period, to obtain a measurement result within the first preset period; and using, by the terminal, a beam reference signal whose measurement result within the first preset period is greater than the first preset threshold as the beam reference signal active set.

Optionally, the second measurement configuration information includes a second preset threshold; and the method further includes: measuring, by the terminal, a beam reference signal in the beam reference signal active set within a second preset period, to obtain a measurement result within the second preset period; and using, by the terminal, a beam reference signal whose measurement result within the second preset period is greater than the second preset threshold as a target beam reference signal.

Optionally, the method further includes: performing, by the terminal within a seventh preset time range, radio link monitoring (RLM) on a target beam on which the target beam reference signal is located; and when the terminal determines that the target beam satisfies a radio link failure (RLF) condition, triggering, by the terminal, a Radio Resource Control connection re-establishment process.

Optionally, the method further includes: when a measurement result of the target beam reference signal is less than a third preset threshold, selecting, by the terminal, a beam on which a beam reference signal in the beam reference signal active set other than the target beam reference signal is located to perform RLM; and when the terminal determines that the target beam reference signal and the beam reference signal other than the target beam reference signal both satisfy the RLF condition, triggering, by the terminal, the Radio Resource Control connection re-establishment process; or performing, by the terminal, RLM on all beam reference signals in the beam reference signal active set; and when the terminal determines that all beams in the active set satisfy the RLF condition, triggering, by the terminal, the Radio Resource Control connection re-establishment process.

According to another aspect of the embodiments of this application, a terminal is provided. The terminal includes: at least one communications interface; at least one bus connected to the at least one communications interface; at least one processor connected to the at least one bus; and at least one memory connected to the at least one bus, where the processor is configured to: obtain first measurement configuration information; obtain beam reference signals sent by one or more base stations; measure the beam reference signals based on the first measurement configuration information, to obtain measurement values of the beam reference signals; and perform filtering on the measurement values of the beam reference signals, to obtain a measurement result, where the measurement result include a cell measurement result and/or a beam measurement result.

Optionally, the processor is configured to perform some or all of the steps in the optional implementations of the foregoing radio resource measurement method provided in this application.

According to another aspect, an embodiment of this application further provides a radio resource measurement method, including: sending, by a base station, first measurement configuration information; and receiving, by the base station, a measurement result sent by a terminal.

For the measurement configuration information and the measurement result in the method, refer to the content of the foregoing aspects, and details are not described herein again.

According to still another aspect, an embodiment of this application further provides a base station, including: a processor and a transceiver, where the processor is configured to send first measurement configuration information using the transceiver and receive, using the transceiver, a measurement result sent by a terminal.

For the measurement configuration information and the measurement result in the aspect, refer to the content of the foregoing aspects, and details are not described herein again.

The measurement result may include a cell measurement result and a beam measurement result. The base station may perform a handover between serving cells or switch a beam for communication for the terminal based on the measurement result.

An embodiment of this application further provides a computer-readable storage medium. The readable storage medium includes an instruction, and when the readable storage medium is run on a computer, the computer is enabled to perform all or some of the steps of the method according to any one of the foregoing aspects. An embodiment of this application further provides a computer program product. When the computer program product is run on a computer, the computer is enabled to perform all or some of the steps of the method according to any one of the foregoing aspects.

According to the radio resource measurement method and the apparatus provided in the embodiments of this application, the terminal obtains the first measurement configuration information, and measures, based on the first measurement configuration information, the beam reference signals sent by the one or more base stations, to obtain the measurement values of the beam reference signals; and the terminal performs filtering on the measurement values of the beam reference signals, to obtain the measurement result. The measurement result may include the cell measurement result and the beam measurement result. The base station may determine, based on the measurement result, whether to perform a handover between serving cells or switch a beam for communication with the terminal. The terminal measures and perform filtering on the beam reference signal that is sent in a form of a beam by the base station, thereby greatly reducing signaling overheads of the terminal and the base station, avoiding a problem of a user communication interruption that is caused by a relatively high handover failure rate of the terminal, and further reducing a communication delay between the terminal and the base station.

It should be understood that, the foregoing general descriptions and the following detailed descriptions are merely for illustration and explanation purposes and are not intended to limit this application.

BRIEF DESCRIPTION OF THE DRAWINGS

The accompanying drawings herein are included in the specification and form a part of the specification, show embodiments that conform to this application, and are used to describe a principle of this application together with the specification.

DETAILED DESCRIPTION OF ILLUSTRATIVE EMBODIMENTS

Embodiments of this application are described below with reference to the accompanying drawings.

At present, a cellular communications technology such as Long Term Evolution (LTE) generally uses a band of approximately 2 GHz or a lower band, and the LTE-A small cell enhancement standardization project is studying and utilizing a band of 3.5 GHz. An assisted access (LTE assisted access, or LAA) technology is studying and utilizing an unlicensed spectrum of a band of 5 GHz. In the Institute of Electrical and Electronics Engineers (IEEE) 802.11ad standard, a band of 60 GHz is used for a wireless local area network (WLAN), and is generally used for short-range indoor communication within a range of approximately 10 meters. However, at present, a band of 6 GHz or a higher band is still not used in the cellular communications technology. A major challenge of applying high-band waves, such as a centimeter wave and a millimeter wave, to cellular communication lies in that there is relatively large free space attenuation in the bands; and affected by factors, such as absorption and scattering by air, rain, fog, a building, or another object, the high-band waves severely attenuate during propagation.

Figure 1:
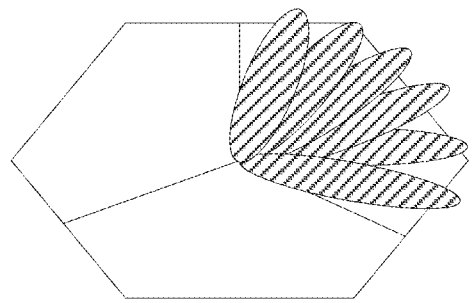
FIG. 1 is a schematic diagram of beamforming according to an embodiment of this application.

A beamforming technology is considered as a potential technology that can be used to resolve a problem of a significant path loss of a high-band wave, such as a millimeter wave, and a massive multiple-input multiple-output antenna (massive MIMO or large scale MIMO) system is considered as a potential direction for implementing the beamforming technology in a high band. FIG. 1 is a schematic diagram of beamforming. A base station transmits beams in different directions at different moments, to implement full coverage of a sector that is also referred to as a cell. In the prior art, there are mainly three beamforming manners. A first manner is a beam switching manner, and is generally implemented using an analog or radio frequency (RF) circuit. A second manner is adaptive beamforming, and is generally implemented using a digital circuit. A third manner is hybrid beamforming, and is a combination of the foregoing two manners.

In high-frequency communication, a beamforming technology needs to be used to improve coverage. Therefore, a reference signal used for RRM measurement may be sent in a form of a beam. However, RRM measurement in an existing LTE technology is based on an omnidirectional CRS or CSI-RS. Therefore, in high-frequency cellular communication, a reference signal sent in a form of a beam cannot be effectively measured by using the prior art.

To resolve the foregoing technical problem, when a base station sends a beam reference signal in a form of a beam to a terminal by using a massive multiple-input multiple-output antenna, the embodiments of this application provide a radio resource measurement method and an apparatus, to measure the beam reference signal sent by the base station to the terminal, and send a obtained measurement result in a form of a measurement report to the base station, so that the base station can switch, based on the measurement report sent by the terminal, a cell or a downlink beam for communication with the terminal. In other words, the base station selects an appropriate cell and/or an appropriate downlink beam for the terminal for communication. It should be noted that, in the embodiments provided in this application, the base station sends a beam reference signal in a form of a beam to the terminal. The beam reference signal includes, but is not limited to, a high-frequency signal and a low-frequency signal. In the embodiments, a high-frequency is used as an example for description, but the embodiments of this application are not limited thereto.

Figure 2:
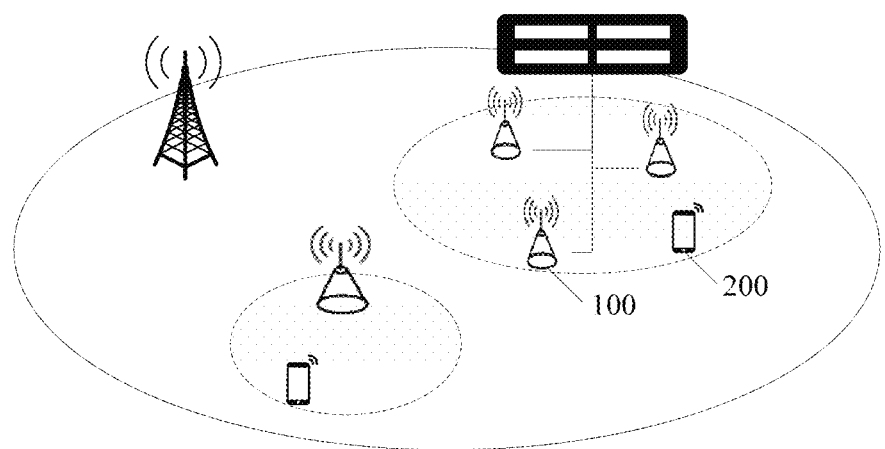
FIG. 2 is a schematic diagram of an application scenario according to another embodiment of this application.

Using an evolved NodeB (eNB) and a terminal as an example, FIG. 2 is a schematic diagram of an application scenario according to an embodiment of this application. FIG. 2 includes a base station 100 and a terminal 200. An eNB is used as an example of the base station 100. As shown in FIG. 2, the terminal 200 may separately establish a wireless communication connection to cells within coverage of the base station 100. The base station 100 may be a base station in an LTE or future communications system, such as a 5G base station, and include a plurality of forms of base stations providing a low-frequency cell, a high-frequency cell, an unlicensed spectrum cell, and the like. In this embodiment, a high-frequency cell is used as an example for description. Correspondingly, the terminal may be an evolved LTE terminal or a next-generation terminal such as a 5G terminal. In addition, this embodiment of this application is applicable to a coordination scenario of high- and low-frequency cells and a scenario of an independent high-frequency cell. One high-frequency cell may include one or more transmission receiving points (TRP) or an area covered by a high-frequency signal provided by the base station 100. In an embodiment provided in this application, with reference to FIG. 2, the base station 100 sends measurement configuration information of one or more high-frequency carriers to the terminal 200, so that the terminal 200 performs measurement, such as RRM measurement, based on the measurement configuration information.

The measurement configuration information includes one or a combination of several of the following: a measurement frequency, a measurement bandwidth, an intra-frequency measurement configuration, an inter-frequency measurement configuration, a physical cell identifier (PCI) of a high-frequency cell, measurement time window information, mobility management reference signal (Mobility Reference Signal, or MRS) information, and a measurement report configuration. The measurement report configuration may be a measurement report period, a threshold for triggering a measurement report, or the like.

Figure 3:
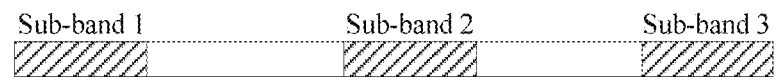
FIG. 3 is a schematic diagram of distribution of sub-bands on a high-frequency carrier according to still another embodiment of this application.

When intra-frequency measurement and/or inter-frequency measurement are/is configured for the terminal, a uniform RRM measurement time window may be configured for the terminal without considering a difference between different beams, a difference between different cells, and a difference between different carriers, thereby reducing complexity of detecting a beam and an MRS by the terminal, and also helping the terminal save power; or MRSs at positions of different sub-bands on a carrier may be configured for the terminal. As shown in FIG. 3, on a high-frequency carrier, three different sub-bands are configured for the terminal to detect an MRS, thereby reducing MRS overheads, and improving accuracy of RRM measurement. The high-frequency carrier in FIG. 3 includes three sub-bands: a sub-band 1, a sub-band 2, and a sub-band 3.

The base station 100 sends a beam reference signal, in a form of a beam, used for RRM measurement to the terminal 200. For example, the base station 100 sends a beam reference signal to the terminal by using the massive multiple-input multiple-output antenna. MRS sequences of beam reference signals of different beams may be the same, or MRS sequences of beam reference signals of different beams may be different.

The terminal 200 receives the measurement configuration information and the beam reference signal that are sent by the base station 100, and the terminal 200 measures, for example, performs RRM measurement on, the beam reference signal based on the measurement configuration information. The base station 100 may send a plurality of beam reference signals to the terminal 200. The terminal 200 may obtain one beam reference signal at a moment, or may obtain a plurality of beam reference signals at a same moment. The terminal 200 may obtain a plurality of different or same beam reference signals at different moments. To be specific, the terminal 200 obtains beam reference signals in a same cell, or obtains beam reference signals in different cells.

After obtaining a beam reference signal, the terminal measures beam reference signals within a period of time, to obtain measurement values of the beam reference signals, and performs filtering on the measurement values of the beam reference signals, to obtain a measurement result. The measurement results may be a cell measurement result, or a beam measurement result, or a cell measurement result and a beam measurement result. Optionally, the measurement result may be selected based on a measurement result type indication sent by the base station. The measurement result type indication sent by the base station may instruct the terminal to report a cell measurement result, or instruct the terminal to report a beam measurement result, or instruct the terminal to report a cell measurement result and a beam measurement result. For example, the measurement result type indication may instruct the terminal to send a cell measurement result, and the terminal needs to obtain the cell measurement result; or the measurement result type indication may instruct the terminal to send a beam measurement result, and the terminal needs to obtain the beam measurement result.

The terminal 200 measures, based on the measurement configuration information sent by the base station 100, beam reference signals in a same cell or different cells obtained by the terminal 200, to obtain measurement values respectively corresponding to the plurality of different beam reference signals. The terminal performs filtering on measurement values that are obtained within a preset period of time, to obtain a measurement result. The measurement result may be a cell measurement result, or a beam measurement result, or a cell measurement result and a beam measurement result. The terminal 200 may send the measurement result in a form of measurement reports to the base station 100, so that base station 100 selects an appropriate cell or downlink beam based on the measurement reports, for communication with the terminal 200. Optionally, the measurement configuration information sent by the base station 100 includes measurement result type indication information, used to instruct the terminal 200 to send a cell measurement result, or a beam measurement result, or a cell measurement result and a beam measurement result to the base station 100.

After measuring the obtained beam reference signals based on the measurement configuration information sent by the base station, to obtain the measurement values of the beam reference signals, the terminal 200 needs to perform filtering on the measurement values, to obtain the measurement result. In a process in which the terminal communicates with the base station, the terminal is very likely to move with a user. Therefore, in the process in which the terminal 200 communicates with the base station, the terminal 200 is very likely to obtain one beam reference signal at a moment, and may obtain a plurality of beam reference signals at a moment (for example, a multipath signal or a beam reference signal in a neighboring cell generated by reflecting a received beam reference signal in a serving cell or in another manner). In addition, the terminal 200 may obtain beam reference signals in a same cell or may obtain beam reference signals in different cells within a period of time.

Therefore, for the foregoing different cases that the terminal 200 encounters, specifically, the measurement values of the beam reference signals may be filtered in the following manners.

(1) When the terminal obtains one beam reference signal at a moment, and the terminal obtains a plurality of beam reference signals at different moments, in a process in which the terminal performs filtering on measurement values corresponding, respectively, to a plurality of beam reference signals that are obtained within a first preset time range, the terminal obtains the measurement values respectively corresponding to the plurality of beam reference signals obtained within the first preset time range, and separately processes the measurement values in a first preset manner, to obtain measurement results of the plurality of beam reference signals obtained within the first preset time range.

In the first preset manner, measurement values respectively corresponding to a plurality of beam reference signals that are obtained within a preset time range may be averaged, that is, the measurement values respectively corresponding to the plurality of beam reference signals are averaged, to obtain an average measurement value of the plurality of beam reference signals. The average measurement value may be used as a first measurement result of the plurality of beam reference signals, and the first measurement result may be used as a cell measurement result.

(2) When the terminal obtains one beam reference signal at a moment, and the terminal obtains a plurality of different beam reference signals at different moments, in a process in which the terminal performs filtering on measurement values respectively corresponding to a plurality of different beam reference signals that are obtained within a second preset time range, the terminal obtains the measurement values respectively corresponding to the plurality of different beam reference signals obtained within the second preset time range, separately processes the measurement values in a second preset manner, to obtain a measurement result of the plurality of different beam reference signals obtained within the second preset time range, and may use the measurement result as a cell measurement result.

When the second preset manner is used, a difference between a plurality of different beam reference signals is considered. For example, same beam reference signals in the plurality of different beam reference signals are used as one category, so that the plurality of different beam reference signals can be classified into a plurality of categories, and measurement values corresponding to beam reference signals of each category are averaged, to obtain an average measurement value corresponding to each category of beam reference signals. In this way, average measurement values respectively corresponding to the plurality of categories of beam reference signals can be obtained, and are used as a second measurement result of the plurality of different beam reference signals, and the second measurement result may be used as a beam measurement result.

(3) When the terminal obtains a plurality of beam reference signals at a same moment, and the terminal obtains a plurality of different beam reference signals at different moments, in a process in which the terminal performs filtering on measurement values respectively corresponding to a plurality of different beam reference signals that are obtained within a third preset time range, the terminal obtains the measurement values respectively corresponding to the plurality of different beam reference signals obtained within the third preset time range, separately processes the measurement values in a third preset manner, to obtain a measurement result of the plurality of different beam reference signals obtained within the third preset time range, and may use the measurement result as a cell measurement result.

The terminal may obtain a plurality of beam reference signals at a same moment within the third preset time range. Therefore, the terminal obtains measurement values respectively corresponding to a plurality of beam reference signals that are obtained at each moment, and averages the measurement values of the plurality of beam reference signals obtained at the same moment, to obtain an average measurement value of the plurality of beam reference signals obtained at the moment, and thus to obtain average measurement values respectively corresponding to beam reference signals at the various moments.

The terminal obtains average measurement values respectively corresponding to the beam reference signals obtained at different moments within the third preset time range, processes the average measurement values in the third preset manner, to obtain a third measurement result, and may use the third measurement result as a cell measurement result.

In the third preset manner, average measurement values respectively corresponding to a plurality of beam reference signals at different moments within a preset time range may be averaged, to obtain a measurement result.

(4) When the terminal obtains a plurality of beam reference signals at a same moment, and the terminal obtains a plurality of different beam reference signals at different moments, in a process in which the terminal performs filtering on measurement values respectively corresponding to a plurality of different beam reference signals that are obtained within a preset time range, the terminal obtains measurement values respectively corresponding to a plurality of different beam reference signals within a fourth preset time range, separately processes the measurement values in a fourth preset manner, to obtain a measurement result of the plurality of different beam reference signals, and may use the measurement result as a cell measurement result.

The terminal may obtain a plurality of beam reference signals at a same moment within the fourth preset time range. Therefore, the terminal obtains measurement values respectively corresponding to a plurality of beam reference signals that are obtained at each moment, and obtains a maximum measurement value of the beam reference signals obtained at the same moment, to obtain maximum measurement values respectively corresponding to the plurality of beam reference signals at the various moments.

The terminal obtains the maximum measurement values respectively corresponding to the plurality of beam reference signals at the various moments within the fourth preset range, and processes the maximum measurement values in a preset manner, to obtain a measurement result.

In the fourth preset manner, maximum measurement values respectively corresponding to a plurality of beam reference signals at various moments within a preset time range may be averaged, to obtain a fourth measurement result, and the fourth measurement result may be used as a cell measurement result.

In addition, if the plurality of beam reference signals obtained by the terminal at the same moment are same beam reference signals, after the maximum measurement values respectively corresponding to the various moments are obtained, in a fifth preset manner, the beam reference signals at the different moments may be distinguished from each other, maximum measurement values corresponding to same beam reference signals at the various moments are averaged, to obtain average measurement values respectively corresponding to various types of beam reference signals, the average measurement values are used as a fifth measurement result of the plurality of different beam reference signals, and the fifth measurement result is used as a beam measurement result.

Certainly, if a difference between a plurality of different beam reference signals is considered, to be specific, the plurality of beam reference signals may be classified into a plurality of different beam reference signals, maximum measurement values respectively corresponding to various types of beam reference signals may be determined in maximum measurement values respectively corresponding to various moments, the measurement values may be used as measurement results of the plurality of different beam reference signals, and the measurement results may be used as a beam measurement result.

(5) When the terminal obtains a plurality of beam reference signals at a same moment, and the terminal obtains a plurality of beam reference signals at different moments, in a process in which the terminal performs filtering on measurement values respectively corresponding to a plurality of beam reference signals that are obtained within a fifth preset time range, the terminal obtains the measurement values respectively corresponding to the plurality of beam reference signals within the fifth preset time range, separately processes the measurement values in a preset manner, to obtain measurement results of the plurality of beam reference signals, and may use the measurement results as a cell measurement result.

The terminal may obtain one or more beam reference signals at a same moment within the fifth preset time range. Therefore, the terminal obtains measurement values of beam reference signals that are obtained at various moments. If the terminal obtains a plurality of beam reference signals at one moment, the terminal averages measurement values respectively corresponding to the plurality of beam reference signals, to obtain an average measurement value at the same moment. If the terminal obtains one beam reference signal at a moment, the terminal uses a measurement value of the beam reference signal as an average measurement value at the moment, so that an average measurement value of a beam reference signal at each moment can be obtained. Therefore, in a sixth preset manner, average measurement values respectively corresponding to various moments may be averaged, to obtain a sixth measurement result of the plurality of beam reference signals within the fifth preset time range, and the sixth measurement result may be used as a cell measurement result.

(6) When the terminal obtains a plurality of beam reference signals at a same moment, and the terminal obtains a plurality of beam reference signals at different moments, in a process in which the terminal performs filtering on measurement values respectively corresponding to a plurality of beam reference signals that are obtained within a preset time range, the terminal obtains measurement values respectively corresponding to a plurality of beam reference signals within a sixth preset time range, and separately processes the measurement values in a seventh preset manner, to obtain measurement results of the plurality of beam reference signals.

The terminal may obtain one or more beam reference signals at a same moment within the sixth preset time range. Therefore, the terminal obtains measurement values of beam reference signals that are obtained at various moments. If the terminal obtains a plurality of beam reference signals at one moment, the terminal obtains a maximum measurement value of measurement values respectively corresponding to the plurality of beam reference signals, to obtain a maximum measurement value at the same moment. If the terminal obtains one beam reference signal at a moment, the terminal uses a measurement value of the beam reference signal as a maximum measurement value at the moment, so that maximum measurement values respectively corresponding to beam reference signals at various moments can be obtained. Therefore, in the seventh preset manner, maximum measurement values respectively corresponding to various moments may be averaged, to obtain a seventh measurement result of the plurality of beam reference signals within the sixth preset time range, and the seventh measurement result may be used as a cell measurement result.

In addition, if a difference between a plurality of different beam reference signals is considered, that is, the plurality of beam reference signals are classified into a plurality of different beam reference signals, maximum measurement values respectively corresponding to various categories of beam reference signals may be determined, in an eighth preset manner, in maximum measurement values respectively corresponding to various moments, the measurement values may be used as an eighth measurement result of the plurality of different beam reference signals, and the eighth measurement result may be used as a beam measurement result.

In the first preset manner to the eighth preset manner in this embodiment of this application, the measurement values of the beam reference signals may be averaged and filtered in the foregoing embodiment, or a maximum value of the measurement values of the beam reference signals may be obtained in the foregoing embodiment. Arithmetic calculation or weighted calculation may be used as required, to obtain an average value. Obtaining of an average weight or coefficient through weighted calculation may be configured or preset. In this embodiment of this application, an average value or a maximum value of measurement values of different beam reference signals may be obtained.

It should be noted that, in this embodiment of this application, the plurality of beam reference signals are two or more beam reference signals.

Figure 15:
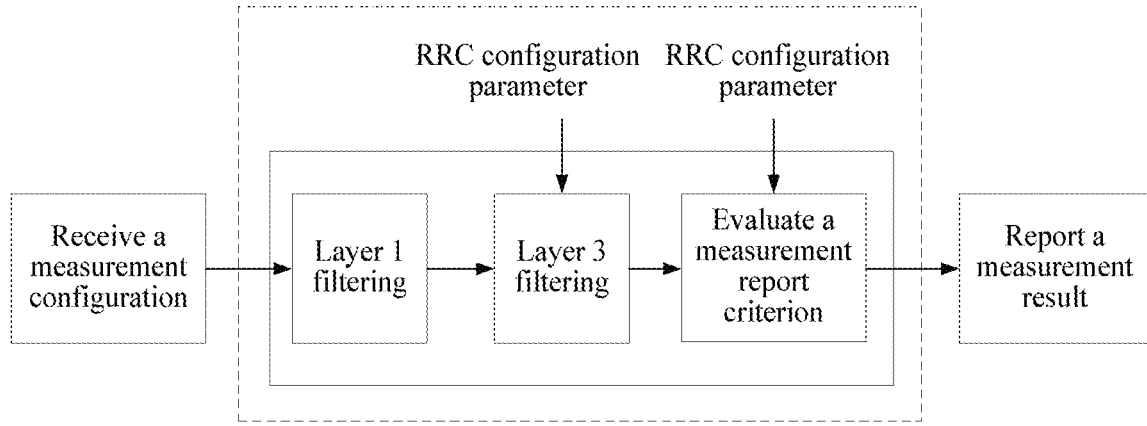
FIG. 15 is a schematic diagram of RRM measurement according to an example of an embodiment.

In an embodiment provided in this application, FIG. 15 is a schematic diagram when the terminal performs RRM measurement. In this embodiment of this application, in a process in which the terminal performs filtering on a measurement value of an obtained beam reference signal, the following averaging manner may be specifically used, but this embodiment of this application is not limited thereto.

The terminal performs Layer 1 (namely, a physical layer) filtering (Layer 1 filtering) on one or more physical layer measurement values based on a particular algorithm (such as arithmetic averaging or weighted averaging), and transfers a result obtained through filtering to Layer 3 (namely, an RRC layer) to perform Layer 3 filtering. A Layer 3 filtering algorithm is shown in the following formula:

$$F_n = (1-a) \cdot F_{n-1} + a \cdot M_n,$$

where $M_n$ is a latest measurement value received from a physical layer; $F_n$ is an updated measurement value, and is used to evaluate a measurement report criterion; $F_{n-1}$ is a previous measurement result; $F_0 = M_1$ is a first measurement value received from the physical layer; and $a = 1/2(k/4)$, and k is a filter coefficient, and is sent by the base station to the terminal by using corresponding measurement configuration information.

The terminal performs evaluation based on a measurement result obtained through the Layer 3 filtering and the measurement report criterion, and determines whether a measurement result reporting condition is satisfied; and if the measurement result reporting condition is satisfied, the terminal sends, to the base station, an RRM measurement report including the measurement result obtained through the Layer 3 filtering.

When using the Layer 3 filtering, the terminal determines, based on different measurement scenarios, time ranges required for different filtering processing. For example, during intra-frequency measurement, a value of the filter coefficient k is 200 ms; and when the value of k is 0, it indicates that no Layer 3 filtering is performed.

According to the foregoing embodiment provided in this application, after a measurement result is obtained, if the measurement result satisfies a configuration condition, a measurement report is generated by using the measurement result, and the terminal sends the measurement report to the base station. The configuration condition may be set as required, for example, a receive power threshold is set. In addition, when the terminal measures a beam reference signal sent by the base station, in this embodiment, different sampling periods and different quantities of sampling points may be used in different measurement models, to meet different measurement requirements. A measurement result includes a cell measurement result and/or a beam measurement result. The base station may select a serving cell for the terminal based on the cell measurement result, and may select a beam signal for communication for the terminal based on the beam measurement result.

The cell measurement result may include a serving cell measurement result and/or a neighboring cell measurement result. When a measurement result of a serving cell does not satisfy a communication condition, if a neighboring cell satisfies the communication condition, the base station switches a cell for communication with the terminal to the neighboring cell.

Figure 4:
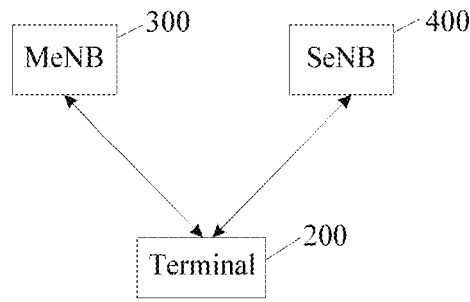
FIG. 4 is a schematic diagram of an application scenario according to still another embodiment of this application.

With reference to the foregoing embodiment, in a coordination architecture of high- and low-frequency carriers based on dual connectivity (DC), different measurement report modes may be configured for the terminal 200. As shown in FIG. 4, the terminal 200 may send, to a master eNB (MeNB) 300, a measurement report including a cell measurement result, and the MeNB 300 determines, based on the cell measurement result, whether to perform a handover between secondary eNBs or change a secondary eNB.

The terminal sends, to a secondary eNB (SeNB) 400, a measurement report including a beam measurement result, and the SeNB 400 selects, based on the beam measurement result, a candidate beam applicable to communication with the terminal 200. Alternatively, the terminal 200 sends, to the SeNB 400, a measurement report including a cell measurement result, so that the SeNB 400 determines, based on the cell measurement result, whether to perform a handover between secondary eNBs.

When the base station obtains the measurement report sent by the terminal, the base station re-sends measurement configuration information to the terminal based on the measurement report. While receiving the measurement configuration information, the terminal continues to obtain beam reference signals sent by the base station. The terminal first determines a beam reference signal measurement set of the beam reference signals based on the measurement configuration information, then determines a beam signal active set in the beam reference signal measurement set, and uses one or more beam reference signals having optimal measurement results in the beam reference signal active set as target beam reference signals. The terminal sends a measurement result, in a form of a measurement report, corresponding to the target beam reference signal to the base station, so that the base station can use the target beam reference signal as a candidate beam for communication with the terminal.

Figure 5:
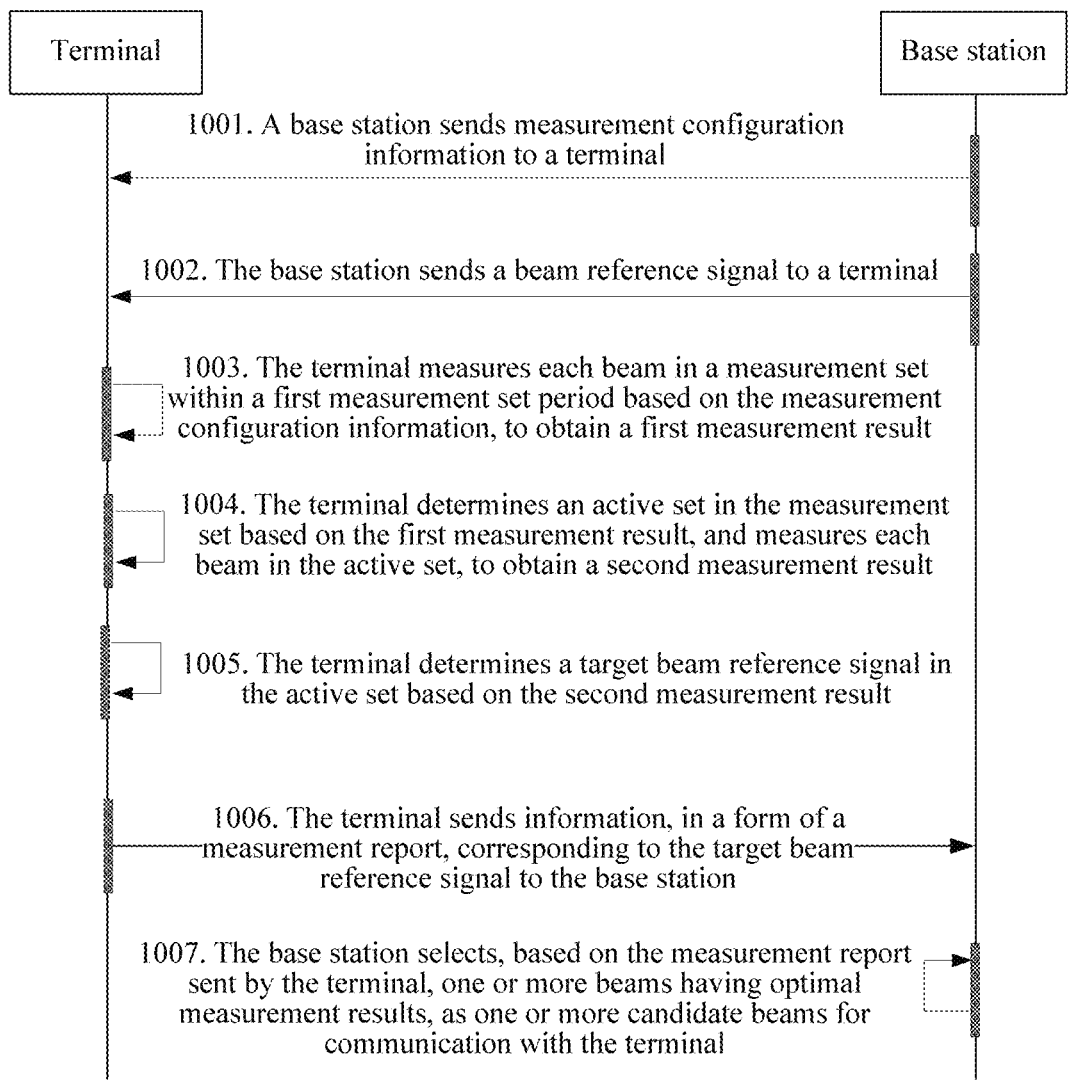
FIG. 5 is a flowchart of a radio resource measurement method according to an example of an embodiment of this application.

To describe, in detail, how a terminal measures a beam reference signal based on measurement configuration information sent by a base station, so that the base station uses, based on a measurement report sent by the terminal, a selected target beam reference signal as a candidate beam for communication with the terminal, in another embodiment provided in this application, as shown in FIG. 5, the following steps may be included.

Step 1001: The base station sends measurement configuration information to the terminal.

The measurement configuration information may include one or a combination of several of the following information: information about a beam measurement set including one or more beam reference signals, a measurement set measurement period, an active set measurement period, beam configuration information, information about a first threshold used to determine a beam active set, and information about a second threshold used to determine an optimal candidate beam (values of the first threshold and the second threshold are not limited). Optionally, the measurement configuration information may further include measurement result type indication information, used to instruct the terminal 200 to send a cell measurement result, or a beam measurement result, or a cell measurement result and a beam measurement result to the base station 100.

Step 1002: The base station sends a beam reference signal to the terminal.

The beam measurement set may include all beams or some beams in a particular cell or all beams or some beams in a plurality of cells of beam reference signals. A same cell may include coverage of beams sent by a plurality of different TRPs or a same TRP; or different beam measurement sets may be respectively maintained for a serving cell and a neighboring cell.

The beam configuration information may include one or a combination of several of the following information: beam identifier information (beam identities or beam indexes) of one or more beams, a reference signal (RS), time-frequency resource information, and antenna port information.

The measurement set measurement period is used by the terminal to measure each beam in the measurement set, and generate or update the beam active set based on a measurement result. The active set measurement period is used by the terminal to measure each beam in the beam active set, to obtain a candidate beam for communication with the terminal. Generally, the measurement set measurement period is longer than or equal to the active set measurement period. When a specified time for the measurement set measurement period or the active set measurement period is reached, the terminal may perform measurement for a period of time, and after the period of time ends, timing of a period is restarted. The measurement set measurement period or the active set measurement period may also be used as a time for the terminal to maintain or update the beam measurement set or the beam active set. Within a time corresponding to the measurement set measurement period or the active set measurement period, the terminal measures different beam sets.

Step 1003: The terminal measures each beam in a measurement set within a first measurement set period based on the measurement configuration information, to obtain a first measurement result.

The terminal detects and measures each beam in the beam measurement set based on the measurement set measurement period, and selects, based on a measurement result and the first threshold, one or more beams from the beams, as the beam active set. The terminal may update the beam active set within a next measurement set measurement period or a subsequent measurement set measurement period, because the measurement result may change.

Step 1004: The terminal determines an active set in the measurement set based on the first measurement result, and measures each beam in the active set, to obtain a second measurement result.

The terminal detects and measures each beam in the beam active set based on the active set measurement period, and selects one or more beams from the beams based on a measurement result and the second threshold. For example, the terminal selects one or more optimal beams based on the threshold in the measurement configuration (or a preset quantity of reported beams). The terminal reports information about the selected one or more beams and the measurement result to the base station, so that the base station can use the one or more beams as candidate beams for communication with the terminal, for example, an SeNB determines a beam on which a physical downlink control channel (PDCCH) is sent to the terminal.

Step 1005: The terminal determines a target beam reference signal in the active set based on the second measurement result.

An optimal beam selected by the terminal within a next active set measurement period or a subsequent active set measurement period may vary, because an active set may vary, and a beam having an optimal measurement result in the active set may change.

Step 1006: The terminal sends information, in a form of a measurement report, corresponding to the target beam reference signal to the base station.

Step 1007: The base station selects, based on the measurement report sent by the terminal, one or more beams having optimal measurement results as candidate beams for communication with the terminal.

When the base station needs to update the beam measurement set, the base station sends new configuration information to the terminal, performs step S1001, and configures a new beam measurement set and other parameter information for the terminal.

In the foregoing steps, beams in the beam measurement set and the beam active set may not belong to a same cell, or may be intra-frequency beams, or may be inter-frequency beams.

It should be noted that, when the measurement result of the beam reference signal is obtained, the manner described above may be used, and details are not described herein again.

The foregoing steps are applicable to a dual connectivity or multi-connection architecture. For example, a high-frequency SeNB set includes a plurality of SeNBs (a first SeNB and another SeNB) or a plurality of TRPs, the beam measurement set or the beam active set includes information about beams from the plurality of SeNBs or the plurality of TRPs, and the terminal sends the measurement report to an MeNB or the first SeNB, to select the first SeNB or another SeNB or an SeNB set or information about a candidate beam thereof.

The radio resource measurement method provided in this embodiment of this application is applicable to RRM measurement in a high-frequency cell or the like, so that in a scenario in which the high-frequency cell is deployed, an appropriate high-frequency cell and/or an appropriate downlink beam are/is selected for the terminal for communication, and further, an appropriate beam may be selected for the terminal for communication, to support mobility of the terminal, ensure communication continuity, and reduce a probability of a communication interruption.

In addition, in this embodiment of this application, for L1/L3 filtering of a downlink beam independent (to be specific, a feature of a downlink beam is not considered) measurement model and a downlink beam-specific measurement model, different measurement requirements (such as a period and a quantity of sampling points) may be used, thereby reducing processing overheads of the terminal, and also ensuring different measurement precision requirements.

In the dual connectivity architecture, based on the downlink beam independent (to be specific, a feature of a downlink beam is not considered) measurement model, information about a beam from the SeNB is concealed from the MeNB, thereby simplifying a cell-specific mobility management process, and reducing signaling overheads of a measurement report.

Based on the downlink beam-specific (to be specific, a feature of a downlink beam is considered) measurement model, the SeNB can more finely manage different beams, and always selects an optimal candidate beam for communication with UE, thereby improving communication reliability and a transmission rate during communication.

In addition, in this embodiment of this application, the terminal autonomously maintains the beam active set, and measures information about a beam in the beam active set based on the active set measurement period, so that measurement and processing overheads of the terminal are reduced, and signaling overheads required by the base station for frequently configuring the beam active set for the terminal are reduced; and the embodiment utilizes beam-specific mobility management controlled by the terminal, and thus network processing is simplified and a delay is reduced. The terminal selects information about one or more optimal beams, and reports the information to the base station, so that the base station always selects a most appropriate downlink beam for communication with the terminal.

In another embodiment provided in this application, a radio link monitoring (RLM) method in a high-frequency cell is further provided.

In LTE, a process in which the terminal performs RLM is as follows: a physical layer of the terminal determines, by measuring a cell-specific reference signal (CRS) and/or measuring a reception condition of a physical downlink control channel (PDCCH), whether to send an out-of-synchronization indication (out of sync) or a synchronization indication (in sync) to a higher-level protocol layer. When a quantity of downlink out-of-synchronization indications sent by the physical layer and continuously received by the terminal is equal to a preset value, a timer is started. During running, if a preset quantity of downlink synchronization indications sent by the physical layer are continuously received, the timer is stopped, and it indicates that a radio link is already recovered. If the timer times out, the terminal considers a radio link failure (RLF), and triggers an RRC connection re-establishment process. In addition, if a Radio Link Control (RLC) protocol data unit reaches a maximum quantity of retransmissions, or a random access process failure occurs, it is also determined that a radio link failure occurs. For example, the timer may be a T310 timer.

Because RLM monitoring is very frequently performed (sampling points need to be monitored at relatively short intervals), if the terminal always detects all beams in a cell, processing load of the terminal is very high, and a normal communication operation may be affected. To reduce overheads of performing RLM by the terminal, in this embodiment of this application, during RLM in a high-frequency cell, the following steps may be included: The terminal determines an optimal downlink beam by using a downlink beam-specific RRM measurement method in the foregoing embodiment; the terminal performs radio link monitoring (RLM) on the optimal downlink beam; and when the optimal downlink beam changes, the terminal performs an RLM process based on a new optimal downlink beam. For example, in a first phase, the terminal performs RLM based on a beam B1 in beam reference signals; and in a second phase, the terminal performs RLM based on a beam B4 in beam reference signals.

When the terminal performs RLM on a target beam reference signal within a preset time range, the terminal determines whether the target beam reference signal satisfies an RLF condition. If the terminal determines that the target beam reference signal satisfies the RLF condition, the terminal triggers a Radio Resource Control connection re-establishment process, to be specific, the terminal sends a Radio Resource Control link re-establishment request message to the base station.

In addition, when a measurement result of the target beam reference signal is less than a third preset threshold, the terminal selects a beam on which a beam reference signal in a beam reference signal active set other than the target beam reference signal is located, to perform RLM; and the terminal may perform parallel RLM on a plurality of beams.

Alternatively, the terminal performs RLM on all beams in the beam reference signal active set.

The terminal selects each beam reference signal based on a descending order of measurement results of beam reference signals in the beam reference signal active set, to perform RLM, and when a measurement result of a beam reference signal having a higher beam reference signal measurement result is less than the third preset threshold, reselects a beam reference signal having a lower beam reference signal measurement result, to perform RLM.

When determining that the target beam reference signal and a beam reference signal other than the target beam reference signal both satisfy the RLF condition, the terminal triggers the Radio Resource Control connection re-establishment process.

Figure 6:
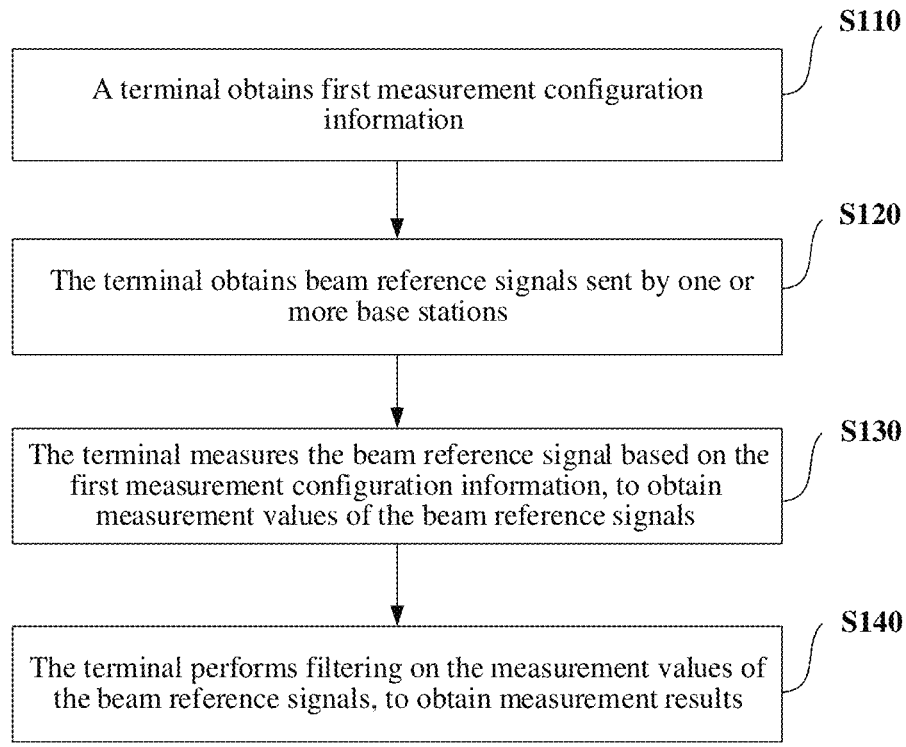
FIG. 6 is a flowchart of a radio resource measurement method according to another example of an embodiment of this application.

To resolve a related technical problem and describe, in detail, the procedure performed in the foregoing embodiment, in another embodiment provided in this application, with reference to the foregoing embodiment, a radio resource measurement method is provided. The method is applied to a terminal, and as shown in FIG. 6, the method may include the following steps.

Step S110: The terminal obtains first measurement configuration information.

The terminal obtains the first measurement configuration information sent by a base station. The first measurement configuration information includes one or a combination of several of the following: a measurement frequency, a measurement bandwidth, an intra-frequency measurement configuration, an inter-frequency measurement configuration, a physical cell identifier (PCI) of a high-frequency cell, measurement time window information, mobility management reference signal (Mobility Reference Signal, or MRS) information, and a measurement report configuration. The measurement report configuration may be a measurement report period, a threshold for triggering a measurement report, or the like.

Step S120: The terminal obtains beam reference signals sent by one or more base stations.

The beam reference signal is a beam reference signal sent by the base station to the terminal by using a massive multiple-input multiple-output antenna. MRS sequences of beam reference signals of different beams are the same, or MRS sequences of beam reference signals of different beams may be different.

When the terminal is at a middle position of a cell, the terminal may obtain a beam reference signal sent by a base station serving the cell. During movement of the terminal, for example, in a process in which the terminal moves from the middle position of the cell to a position between two cells, the terminal is very likely to obtain beam reference signals sent by one or more base stations, to be specific, the terminal obtains beam reference signals sent in one or more cells.

Step S130: The terminal measures the beam reference signals based on the first measurement configuration information, to obtain measurement values of the beam reference signals.

The terminal receives the measurement configuration information and the beam reference signal that are sent by the base station. The terminal measures, for example, performs RRM measurement on, the beam reference signal based on the measurement configuration information. The terminal measures the at least one received beam reference signal. In this embodiment, an example in which the terminal receives a plurality of beam reference signals sent by the base station is used for description.

The terminal measures each of the received beam reference signals, to obtain a measurement value of each measurement sample, performs filtering on the measurement values of the beam reference signals based on the measurement values, and may further calculate a measurement result of a high-frequency cell based on measurement results of the beam reference signals. The terminal generates a measurement report by using the measurement results, and sends the measurement report to the base station, so that the base station selects an appropriate high-frequency cell or downlink beam based on the measurement report, for communication with the terminal.

A specific manner of measuring, by the terminal, the beam reference signal sent by the base station is already described in detail in the foregoing related embodiment. For details, refer to the foregoing embodiment, and details are not described herein again.

Step S140: The terminal performs filtering on the measurement values of the beam reference signals, to obtain a measurement result.

The measurement results include a cell measurement result and/or a beam measurement result.

In a process of sending the beam reference signal to the terminal by the base station, there may be an unstable factor such as a path loss. Consequently, obtained measurement values of one or more beam reference signals cannot represent a measurement result of all beam reference signals. Therefore, measurement values of beam reference signals within a preset period of time need to be filtered, to obtain a measurement result that can represent the beam reference signals obtained within the preset period of time, so that the measurement result has higher reference and use value.

The terminal performs Layer 3 filtering, namely, physical layer, MAC layer, and Radio Resource Control (RRC) layer filtering, on the measurement values of the beam reference signal.

In addition, the terminal generates the measurement report by using the measurement result, and sends the measurement report to the base station.

The measurement report may include a cell measurement report and a beam measurement report. The base station includes a master eNB MeNB and a secondary eNB SeNB. The terminal sends the cell measurement report to the master eNB MeNB. The terminal sends the beam measurement report to the secondary eNB SeNB.

Figure 7:
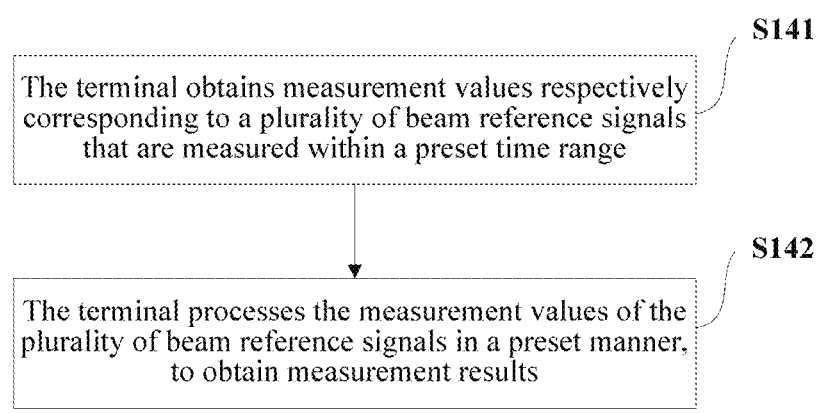
FIG. 7 is a flowchart of step S140 in FIG. 6.

The beam reference signals are beam reference signals in a same cell obtained by the terminal, or the beam reference signals are beam reference signals in different cells obtained by the terminal. Therefore, to provide more details for the method in FIG. 6, as shown in FIG. 7, in another embodiment provided in this application, step S140 may further include the following steps.

Step S141: The terminal obtains measurement values respectively corresponding to a plurality of beam reference signals that are measured within a preset time range.

Step S142: The terminal processes the measurement values of the plurality of beam reference signals in a preset manner, to obtain measurement results.

The terminal may obtain one beam reference signal at a moment, or the terminal may obtain a plurality of beam reference signals at a same moment. At a plurality of moments within a preset period of time, the terminal may obtain beam reference signals in a same cell, or may obtain beam reference signals sent in different cells; and the terminal measures the obtained beam reference signals, to respectively obtain measurement values, and then performs filtering on the measurement values, to obtain measurement results. A detailed process of filtering the measurement values by the terminal is already recorded in the foregoing embodiment, and details are not described herein again.

Figure 8:
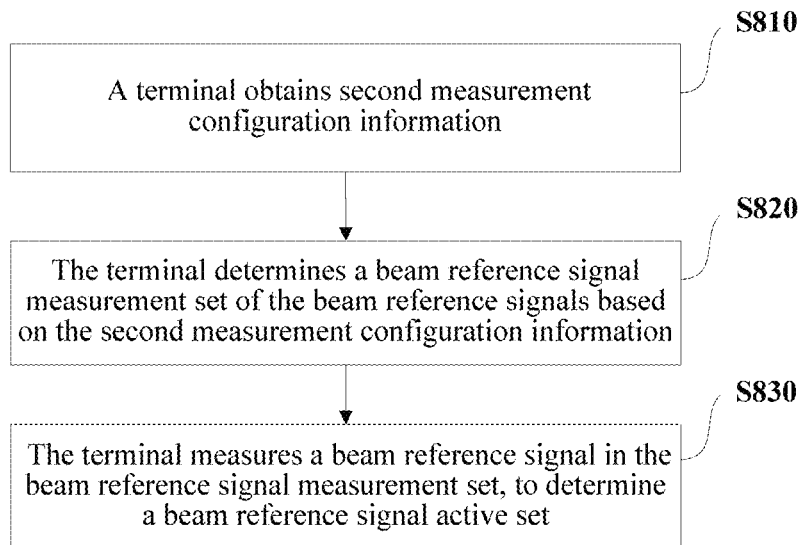
FIG. 8 is a flowchart of a radio resource measurement method according to another example of an embodiment of this application.

To describe, in detail, how a terminal measures a beam reference signal based on measurement configuration information sent by a base station, so that the base station uses, based on a measurement report sent by the terminal, a selected target beam reference signal as a candidate beam for communication with the terminal, in another embodiment provided in this application, as shown in FIG. 8, the following steps may be included.

Step S810: The terminal obtains second measurement configuration information.

The measurement configuration information may include one or a combination of several of the following information: information about a beam measurement set including one or more beam reference signals, a measurement set measurement period, an active set measurement period, beam configuration information, information about a first threshold used to determine a beam active set, and information about a second threshold used to determine an optimal candidate beam.

Step S820: The terminal determines a beam reference signal measurement set of beam reference signals based on the second measurement configuration information.

The base station may send a plurality of beam reference signals to the terminal. Therefore, the terminal may determine, based on the second measurement configuration information sent by the base station, a measurement set of beams that need to be measured in the plurality of beam reference signals.

Step S830: The terminal measures a beam reference signal in the beam reference signal measurement set, to determine a beam reference signal active set.

Figure 9:
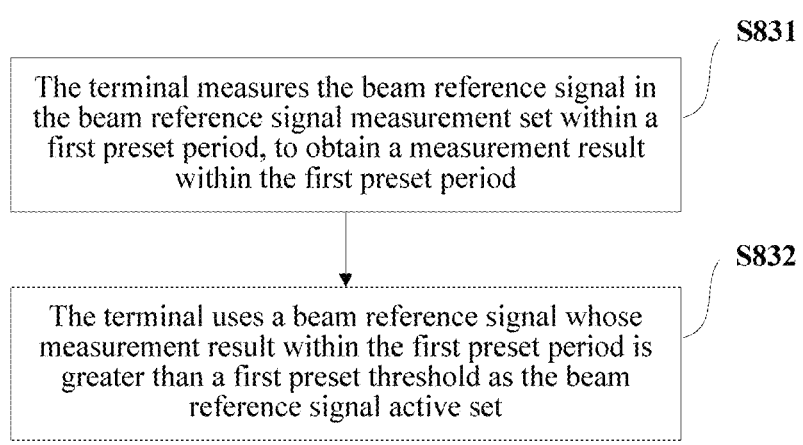
FIG. 9 is a schematic diagram of step S830 in FIG. 8.

Specifically, the second measurement configuration information includes a first preset threshold. Therefore, to provide more details for the method in FIG. 8, as shown in FIG. 9, in another embodiment provided in this application, step S830 may further include the following steps.

Step 831: The terminal measures the beam reference signal in the beam reference signal measurement set within a first preset period, to obtain a measurement result within the first preset period.

Step 832: The terminal uses a beam reference signal whose measurement result within the first preset period is greater than a first preset threshold as the beam reference signal active set.

The first preset period is equivalent to the measurement set measurement period in the foregoing embodiment, and a second preset period is equivalent to the active set measurement period in the foregoing embodiment.

The terminal measures the beam reference signal in the beam reference signal measurement set, to obtain the measurement value of the beam reference signal, and selects the beam reference signal active set from the beam reference signal measurement set based on the first threshold in the second measurement configuration information. For example, a beam reference signal whose transmit power is greater than a threshold in the beam reference signal measurement set is determined as the beam reference signal active set.

The second measurement configuration information includes a second preset threshold. To provide more details for the method in FIG. 9, in another embodiment provided in this application, the following steps may further be included.

Step 833: The terminal measures a beam reference signal in the beam reference signal active set within a second preset period, to obtain a measurement result within the second preset period.

Step 834: The terminal uses a beam reference signal whose measurement result within the second preset period is greater than the second preset threshold as a target beam reference signal.

To further select one or more beam reference signals having optimal measurement results from the beam reference signal active set as candidate beams, the terminal uses, based on the second preset threshold, one or more beam reference signals having maximum measurement values in the active set as one or more target beam reference signals, and sends the measurement result and information corresponding to the one or more target beam reference signals to the base station, so that the base station uses a target beam reference signal as a candidate beam for communication with the terminal.

According to the radio resource measurement method provided in this embodiment of this application, the terminal receives the first measurement configuration information sent by the base station, and measures the beam reference signals based on the first measurement configuration information, to obtain the measurement values of the beam reference signals; and the terminal performs filtering on the measurement values of the beam reference signals, to obtain the measurement results. The measurement results may include the cell measurement result and the beam measurement result. The base station may determine, based on the measurement results, whether to perform a handover between serving cells or switch a beam for communication with the terminal. The terminal measures and performs filtering on the beam reference signal that is sent in a form of a beam by the base station, thereby greatly reducing signaling overheads of the terminal and the base station, avoiding a problem of a user communication interruption that is caused by a relatively high handover failure rate of the terminal, and further reducing a communication delay between the terminal and the base station.

Based on the foregoing descriptions of the method embodiments, a person skilled in the art may clearly understand that this application may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a read-only memory (ROM), a random access memory (RAM), a magnetic disk, or an optical disc.

In addition, for implementation of the foregoing embodiments, an embodiment of this application further provides a radio resource measurement apparatus. The apparatus is located in a terminal, and as shown in FIG. 10, the apparatus includes: a first information obtaining unit 10, configured to obtain first measurement configuration information; a signal obtaining unit 20, configured to obtain beam reference signals sent by one or more base stations; a measurement unit 30, configured to measure the beam reference signals based on the first measurement configuration information, to obtain measurement values of the beam reference signals; and a filtering unit 40, configured to perform filtering on the measurement values of the beam reference signals, to obtain measurement results, where the measurement results include a cell measurement result and/or a beam measurement result.

Figure 10:
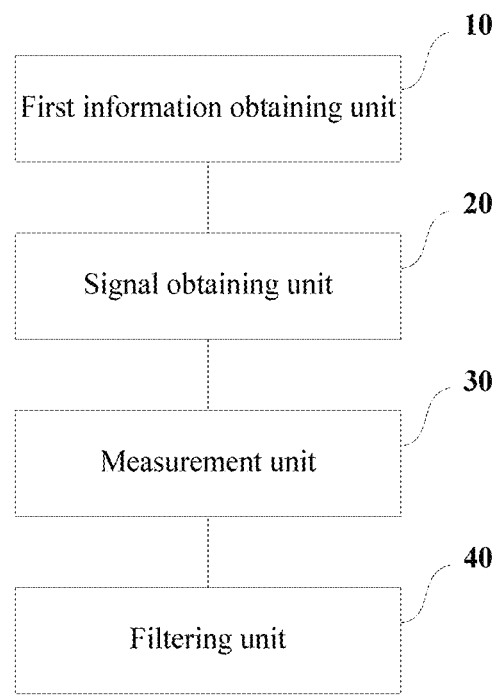
FIG. 10 is a schematic structural diagram of a radio resource measurement apparatus according to an example of an embodiment.
Figure 11:
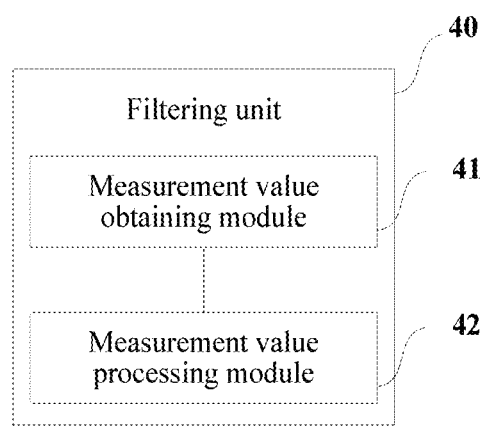
FIG. 11 is a schematic diagram of a filtering unit in FIG. 10.

In another embodiment of this application, the beam reference signals are beam reference signals in a same cell obtained by the terminal, or the beam reference signals are beam reference signals in different cells obtained by the terminal; and based on FIG. 10, as shown in FIG. 11, the filtering unit 40 includes: a measurement value obtaining module 41, configured to obtain, by the terminal, measurement values respectively corresponding to a plurality of beam reference signals that are measured within a preset time range; and a measurement value processing module 42, configured to process the measurement values of the plurality of beam reference signals in a preset manner, to obtain the measurement results.

Figure 12:
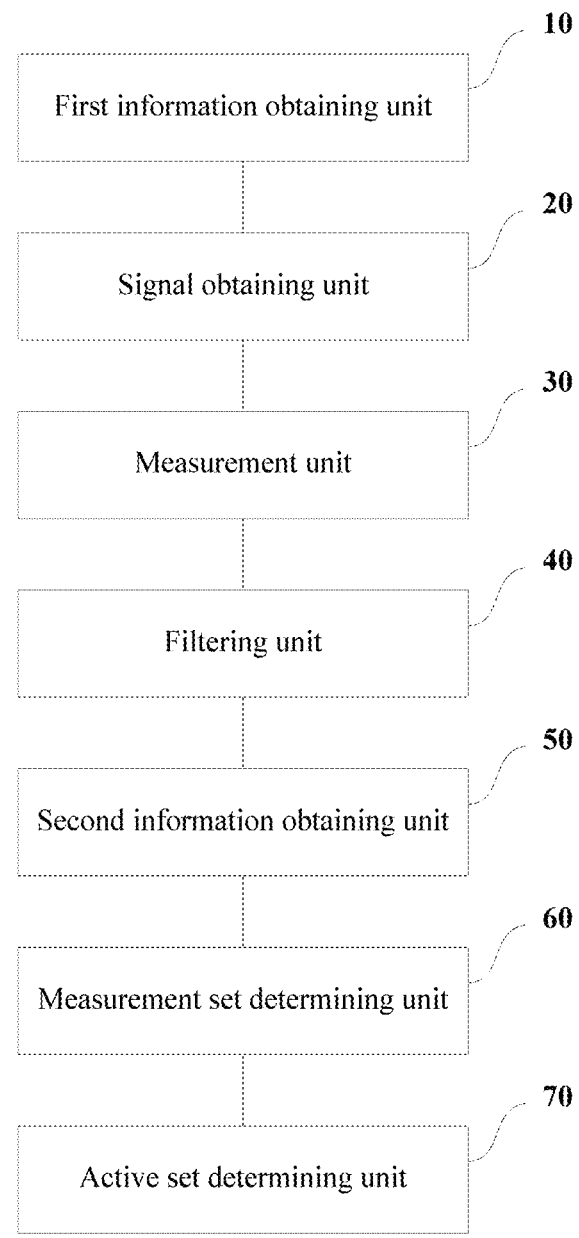
FIG. 12 is a schematic structural diagram of a radio resource measurement apparatus according to another example of an embodiment.

In another embodiment of this application, based on FIG. 10, as shown in FIG. 12, the apparatus may further include: a second information obtaining unit 50, configured to obtain second measurement configuration information; a measurement set determining unit 60, configured to determine a beam reference signal measurement set of the beam reference signals based on the second measurement configuration information; and an active set determining unit 70, configured to measure, by the terminal, a beam reference signal in the beam reference signal measurement set, to determine a beam reference signal active set.

Figure 13:
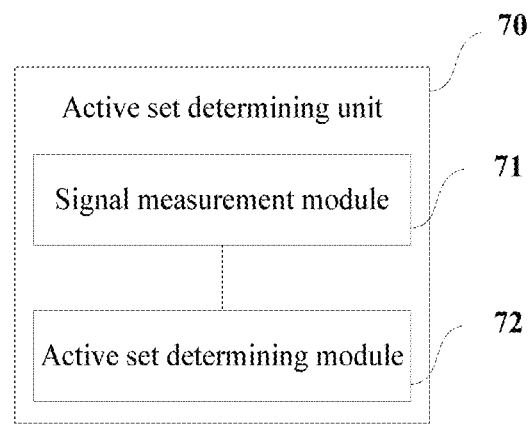
FIG. 13 is a schematic diagram of an active set determining unit in FIG. 12.

In another embodiment of this application, the second measurement configuration information includes a first preset threshold; and based on FIG. 12, as shown in FIG. 13, the active set determining unit 70 includes: a signal measurement module 71, configured to measure the beam reference signal in the beam reference signal measurement set within a first preset period, to obtain a measurement result within the first preset period; and an active set determining module 72, configured to use a beam reference signal whose measurement result within the first preset period is greater than the first preset threshold as the beam reference signal active set.

For the apparatus in the foregoing embodiment, a specific manner in which each module performs an operation is already described in detail in the embodiments related to the method, and details are not described herein again.

Figure 14:
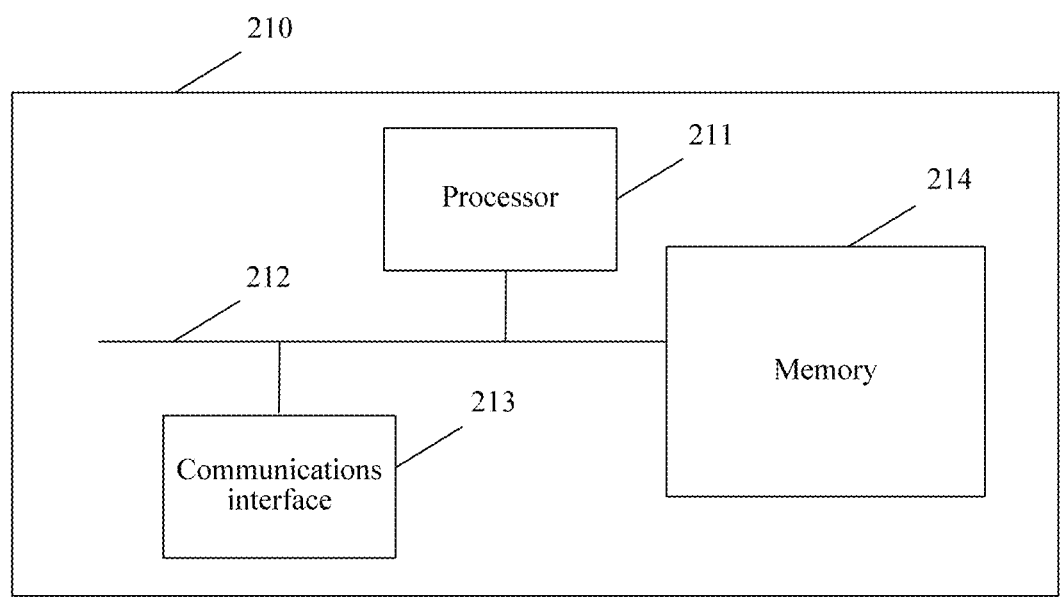
FIG. 14 is a schematic structural diagram of a terminal according to an example of an embodiment.

An embodiment of this application further provides a terminal. As shown in FIG. 14, the terminal 210 includes: at least one processor 211, at least one bus 212, at least one communications interface 213, and at least one memory 214. The memory 211 is configured to store a computer executable instruction. The memory 204 may include a read-only memory and a random access memory, and provide an instruction and data to the processor 201. A part of the memory 204 may further include a non-volatile random access memory (NVRAM). The processor 211 is connected to the communications interface 213 and the memory 214 by using the bus 212. In an embodiment of this application, when a computer is run, the processor 211 executes the computer executable instruction stored in the memory 214, and the processor 211 can perform the steps in the embodiment shown in FIG. 6, and is configured to: obtain beam reference signals sent by one or more base stations; measure the beam reference signals based on the first measurement configuration information, to obtain measurement values of the beam reference signals; and perform filtering on the measurement values of the beam reference signals, to obtain a measurement result, where the measurement result include a cell measurement result and/or a beam measurement result.

In an optional implementation, the beam reference signals are beam reference signals in a same cell obtained by the terminal, or the beam reference signals are beam reference signals in different cells obtained by the terminal; and the processor is further configured to: obtain measurement values respectively corresponding to a plurality of beam reference signals that are measured within a preset time range; and process the measurement values of the plurality of beam reference signals in a preset manner, to obtain the measurement result.

In another optional implementation, when the terminal obtains one beam reference signal at a moment, and the terminal obtains a plurality of beam reference signals at different moments, the processor is further configured to: obtain measurement values respectively corresponding to the plurality of beam reference signals within a first preset time range; and process, in a first preset manner, the measurement values respectively corresponding to the plurality of beam reference signals obtained within the first preset time range, to obtain a first measurement result of the plurality of beam reference signals, and use the first measurement result as the cell measurement result.

In another optional implementation, the preset manner includes: the foregoing first preset manner to eighth preset manner; and that the terminal processes the measurement values of the plurality of beam reference signals in a preset manner includes: the terminal processes the measurement values of the beam reference signals in the same cell in any one of the first preset manner to the eighth preset manner; and/or the terminal processes beam reference signals in each of the different cells in any one of the first preset manner to the eighth preset manner.

In another optional implementation, when the terminal obtains one beam reference signal at a moment, and the terminal obtains a plurality of different beam reference signals at different moments, the processor is further configured to: obtain measurement values respectively corresponding to the plurality of different beam reference signals within a second preset time range; and process, in a second preset manner, a measurement value corresponding to each category of beam reference signals in the plurality of different beam reference signals within the second preset time range, to obtain a second measurement result of the plurality of different beam reference signals, and use the second measurement result as the beam measurement result.

In another optional implementation, when the terminal obtains a plurality of beam reference signals at a same moment, and the terminal obtains a plurality of different beam reference signals at different moments, the processor is further configured to: obtain measurement values respectively corresponding to the plurality of beam reference signals at the same moment; average the measurement values respectively corresponding to the plurality of beam reference signals at the same moment, to obtain an average measurement value of the plurality of beam reference signals at the same moment; obtain average measurement values respectively corresponding to different moments within a third preset time range; and process, in a third preset manner, the average measurement values respectively corresponding to the different moments within the third preset time range, to obtain a third measurement result, and use the third measurement result as the cell measurement result.

In another optional implementation, when the terminal obtains a plurality of different beam reference signals at a same moment, and the terminal obtains a plurality of different beam reference signals at different moments, the processor is further configured to: obtain a measurement value of each of the plurality of different beam reference signals obtained at the same moment; obtain a maximum measurement value of the plurality of different beam reference signals at the same moment; obtain maximum measurement values respectively corresponding to different moments within a fourth preset time range; and process, in a fourth preset manner, the maximum measurement values corresponding to the different moments within the fourth preset time range, to obtain a fourth measurement result, and use the fourth measurement result as the cell measurement result; or process, in a fifth preset manner, the maximum measurement values corresponding to the different moments within the fourth preset time range, to obtain a fifth measurement result, and use the fifth measurement result as the beam measurement result.

In another optional implementation, when the terminal obtains one or more beam reference signals at a same moment, and the terminal obtains a plurality of beam reference signals at different moments, the processor is further configured to: obtain, measurement values respectively corresponding to a plurality of beam reference signals within a fifth preset time range; average measurement values respectively corresponding to the plurality of beam reference signals that is obtained at the same moment, to obtain an average measurement value of the plurality of beam reference signals at the same moment; and process, in a sixth preset manner, average measurement values respectively corresponding to different moments within the fifth preset time range, to obtain a sixth measurement result, and use the sixth measurement result as the cell measurement result.

In another optional implementation, when the terminal obtains one or more beam reference signals at a same moment, and the terminal receives a plurality of beam reference signals at different moments, the processor is further configured to: obtain measurement values respectively corresponding to a plurality of beam reference signals within a sixth preset time range; obtain a maximum measurement value of the plurality of different beam reference signals that is obtained at the same moment; process, in a seventh preset manner, maximum measurement values corresponding to different moments within the sixth preset time range, to obtain a seventh measurement result, and use the seventh measurement result as the cell measurement result; or process, in an eighth preset manner, maximum measurement values corresponding to different moments within the sixth preset time range, to obtain an eighth measurement result, and use the eighth measurement result as the beam measurement result.

In another optional implementation, the terminal obtains measurement results of a plurality of beam reference signals in a same cell or different cells; and the cell measurement result includes a serving cell measurement result and/or a neighboring cell measurement result.

In another optional implementation, the processor is further configured to: obtain second measurement configuration information; determine a beam reference signal measurement set of the beam reference signals based on the second measurement configuration information; and measure a beam reference signal in the beam reference signal measurement set, to determine a beam reference signal active set.

In another optional implementation, the second measurement configuration information includes a first preset threshold; and the processor is further configured to: measure the beam reference signal in the beam reference signal measurement set within a first preset period, to obtain a measurement result within the first preset period; and use a beam reference signal whose measurement result within the first preset period is greater than the first preset threshold as the beam reference signal active set.

In another optional implementation, the second measurement configuration information includes a second preset threshold; and the processor is further configured to: measure a beam reference signal in the beam reference signal active set within a second preset period, to obtain a measurement result within the second preset period; and use a beam reference signal whose measurement result within the second preset period is greater than the second preset threshold as a target beam reference signal.

In another optional implementation, the processor is further configured to: perform, by the terminal within a seventh preset time range, radio link monitoring (RLM) on a target beam on which the target beam reference signal is located; and when the terminal determines that the target beam reference signal satisfies a radio link failure (RLF) condition, trigger, by the terminal, a Radio Resource Control connection re-establishment process.

In another optional implementation, the processor is further configured to: when a measurement result of the target beam reference signal is less than a third preset threshold, select, by the terminal, a beam on which a beam reference signal in the beam reference signal active set other than the target beam reference signal is located to perform RLM; and when the terminal determines that the target beam reference signal and the beam reference signal other than the target beam reference signal both satisfy the RLF condition, trigger, by the terminal, the Radio Resource Control connection re-establishment process; or perform, by the terminal, RLM on all beam reference signals in the beam reference signal active set; and when the terminal determines that all beams in the active set satisfy the RLF condition, trigger, by the terminal, the Radio Resource Control connection re-establishment process.

Because a high-frequency signal features relatively low penetrability, fast attenuation of signal quality when encountering an obstruction, and the like, when the terminal transmits data to the base station through high-frequency communication, once the high-frequency signal for communication between the terminal and the base station deteriorates, it is very likely to affect normal communication between the terminal and the base station. Therefore, to compensate for a path loss of the high-frequency signal, to improve service transmission reliability, generally, a plurality of beams are configured for the terminal to simultaneously perform data transmission.

However, based on the fact that a high-frequency signal has intrinsic features such as low penetrability and fast attenuation when encountering an obstruction, for one terminal, although a large quantity of beams are configured for the terminal and are active, when the terminal communicates with the base station by using the configured beams, if signals of some beams suddenly attenuate, when the terminal and the base station continue to maintain the beams in an active state, a waste of network resources is caused, and power consumption of the terminal is also greatly increased.

Therefore, when the terminal communicates with the base station by using a plurality of beams, if signal quality of some beams suddenly deteriorates, to avoid a problem such as a waste of network resources that is caused when the terminal and the base station continue to maintain the beams, embodiments of this application further provide a radio resource selection method and an apparatus.

In the embodiments provided in this application, a beam is a spatial resource for performing communication by using a high-frequency signal. One base station may communicate with different terminals by using a same beam, or one terminal may communicate with a base station by using one or more beams. The solutions provided in the embodiments of this application are also applicable to another spatial resource such as a port.

In a first design manner provided in an embodiment of this application, the terminal may deactivate or delete a beam that does not meet communication quality.

In this embodiment, the terminal may obtain a measurement result of a beam. The terminal may obtain measurement results of one or more beams. The one or more beams are beams in an active state for the terminal.

For the terminal, states of a configured beam may be classified into the active state and a deactivate state. A beam in the active state may also be referred to as an active beam, and a beam in the deactivate state may also be referred to as a deactivate beam. Information about a deactivate beam may be retained in the terminal or the base station. For the terminal, a beam in the active state may be used by the terminal and the base station to perform data transmission, and a beam in the deactivate state is not used by the terminal and the base station to perform data transmission. An active beam may become a deactivate beam by a deactivation operation, and a deactivate beam may become an active beam by an activation operation. A person skilled in the art should learn that the active state and the deactivate state of a beam are specific to a dimension of a terminal. For example, a beam may be a deactivate beam for one terminal, and may be an active beam for another terminal. For another example, that the base station deactivates a beam means that the base station sets a state of beam to deactivate for a terminal, without affecting a state of the beam for another terminal.

For the terminal, a non-configured beam means that the terminal stores no related information of the beam.

The terminal may obtain a measurement result in a plurality of manners. For example, the terminal may measure a beam to obtain a measurement result, or obtain measurement results of the one or more beams from another terminal, or may obtain measurement results of the one or more beams from the base station. The measurement results of the one or more beams obtained from the base station may be measured by the base station or may be measured by another terminal. Optionally, the base station may indicate, to the terminal, a beam that needs to be measured. Optionally, the terminal may voluntarily select a beam that needs to be measured. The measurement result may be used to evaluate communication quality of the beam. For example, a measurement result of beam signal quality may be used as the measurement result or a part of the measurement result. For another example, a measurement result of a beam path loss may be used as the measurement result or a part of the measurement result.

After obtaining the measurement results of the one or more beams, the terminal may determine whether the measurement results of the one or more beams satisfy a first quality condition, to be specific, determine whether the beam meets a communication quality requirement. The first quality condition is a condition used to determine whether a beam satisfies the communication quality requirement, and a beam satisfying the first quality condition may be considered as a beam that does not meet the communication quality requirement. For example, the first quality condition may be that signal quality is less than a threshold, or signal quality is less than a threshold within a period of time, or a quantity of times that signal quality is less than a threshold within a period of time is greater than a preset quantity of times. For another example, the first quality condition may be that a beam path loss is greater than a threshold, or a beam path loss is greater than a threshold within a period of time, or a quantity of times that a beam path loss is greater than a threshold within a period of time is greater than a preset quantity of times. Content of the first quality condition may be formulated as required, and the content of the first quality condition is not limited in this application. The first quality condition may be sent by the base station to the terminal or may be specified in a communication standard. The first quality condition may also be implicitly indicated. For example, if it is specified in a standard that the quality requirement is that signal strength is greater than or equal to a threshold A, it may be considered that it implicitly indicates that the first quality condition is that signal strength is less than the threshold A.

After determining one or more beams that do not meet the communication quality requirement, the terminal may send first indication information to the base station. The first indication information is used to instruct to deactivate or delete the one or more beams that do not meet the communication quality requirement. Optionally, the terminal may voluntarily deactivate or delete the one or more beams that do not meet the communication quality requirement. After deactivating or deleting the one or more beams that do not meet the communication quality requirement, the terminal does not communicate with the base station by using the one or more beams that do not meet the communication quality requirement.

A bit may be used to indicate a state of a beam on the terminal or the base station, and the beam may be deactivated by changing a value of the bit. The beam may be deleted by deleting a context of the beam, to be specific, information about the beam stored in the terminal or the base station is deleted.

After receiving the first indication information sent by the terminal, the base station may deactivate or delete the one or more beams that do not meet the communication quality requirement. During communication with the base station, the terminal deactivates or deletes the one or more beams that do not meet the communication quality requirement, so that if signals of beams for communication between the terminal and the base station suddenly attenuate, or the like, a problem of a waste of network resources that is caused when communication is still performed by using the beams that do not meet the communication quality requirement can be avoided, and a problem of a great increase in power consumption that is caused when the terminal still performs communication by using the beams having relatively low communication quality can further be avoided.

The terminal may send the first indication information to the base station in a plurality of manners.

In a first optional manner, the terminal may send the first indication information by using the beam that does not meet the communication quality requirement. Optionally, the first indication information may be deactivation indication information or deletion indication information. After receiving the first indication information on the beam, the base station can learn that the beam needs to deactivated or deleted.

The first indication information may be implemented in a plurality of manners. In an optional manner thereof, identifier information of the beam that does not meet the communication quality requirement is used as the first indication information or a part of the first indication information. After receiving the identifier information of the beam on the beam, the base station can immediately deactivate or delete the beam. In another optional manner thereof, quality information of the beam that does not meet the communication quality requirement is used as the first indication information or a part of the first indication information. For example, a CQI (channel quality indicator)=0 may be sent to the base station, and after receiving the CQI=0 on the beam, the base station can immediately deactivate or delete the beam. It may be considered that the CQI=0 indicates poor communication quality of the beam. In another optional manner thereof, a deactivation or deletion indicator is used as the first indication information or a part of the first indication information. The deactivation indication information or the deletion indication information may be represented by using a bit.

In a second optional manner, the terminal may send the first indication information by using a beam other than the beam that does not meet the communication quality requirement. When the first indication information is sent on the another beam, the identifier information of the beam that does not meet the communication quality requirement may be used as the first indication information or a part of the first indication information. Optionally, the quality information of the beam that does not meet the communication quality requirement may be used as a part of the first indication information. Optionally, the deactivation indication information or the deletion indication information may be used as a part of the first indication information.

In a third optional manner, the terminal may send the first indication information to the base station by using a macro network or a low-frequency network. The sending information by using a macro network or a low-frequency network may be understood as sending the first indication information to the base station by using a network, for example, an NR (new radio) network (a 5G network for short), an LTE network, a UMTS network, or a GSM network. For an implementation of the first indication information, refer to the foregoing second optional manner, and details are not described herein again. Specifically, the terminal may send the first indication information by using a MAC layer or an RRC layer, to send the first indication information to the base station by using the macro network or the low-frequency network.

After the terminal sends the first indication information to the base station, the base station may deactivate or delete the beam that does not meet the communication quality requirement, to be specific, the base station may stop communicating with the terminal by using the beam. After sending the first indication information to the base station, the terminal may stop monitoring the beam. Optionally, after receiving feedback information of the first indication information that is sent by the base station, the terminal may stop monitoring the beam. The feedback information may carry the identifier information of the deactivated or deleted beam, and the identifier information of the beam includes at least one of an identifier of the beam, an antenna port identifier of the beam, or a reference signal of the beam, or other identifier information.

In this way, if the base station is subject to external interference, or the like, once the base station does not receive the first indication information sent by the terminal, and continues to send data to the terminal by using the beam, a problem of a data loss that is caused because the terminal prematurely stops monitoring the beam can be avoided.

Because a high-frequency signal features relatively low penetrability, fast attenuation of signal quality when encountering an obstruction, and the like, in the foregoing embodiment, once a problem such as signal attenuation of a beam for communication between the terminal and the base station occurs, the terminal may send the first indication information to the base station, to instruct the base station to deactivate or delete the beam satisfying the first quality condition. For example, during movement of the terminal, if the terminal enters a blocked area, some beams for communication between the terminal and the base station are blocked in the blocked area. Consequently, signal quality is affected, and a problem such as signal attenuation of the beams is caused. In this case, the terminal instructs the base station to deactivate or delete the beams, to avoid affecting quality of communication between the terminal and the base station.

For ease of description, in this embodiment of this application, an example in which a network device is a base station is used for description. For example, the base station may be a base station having a 4G or 5G communication function, but this embodiment of this application is not limited thereto.

Figure 16:
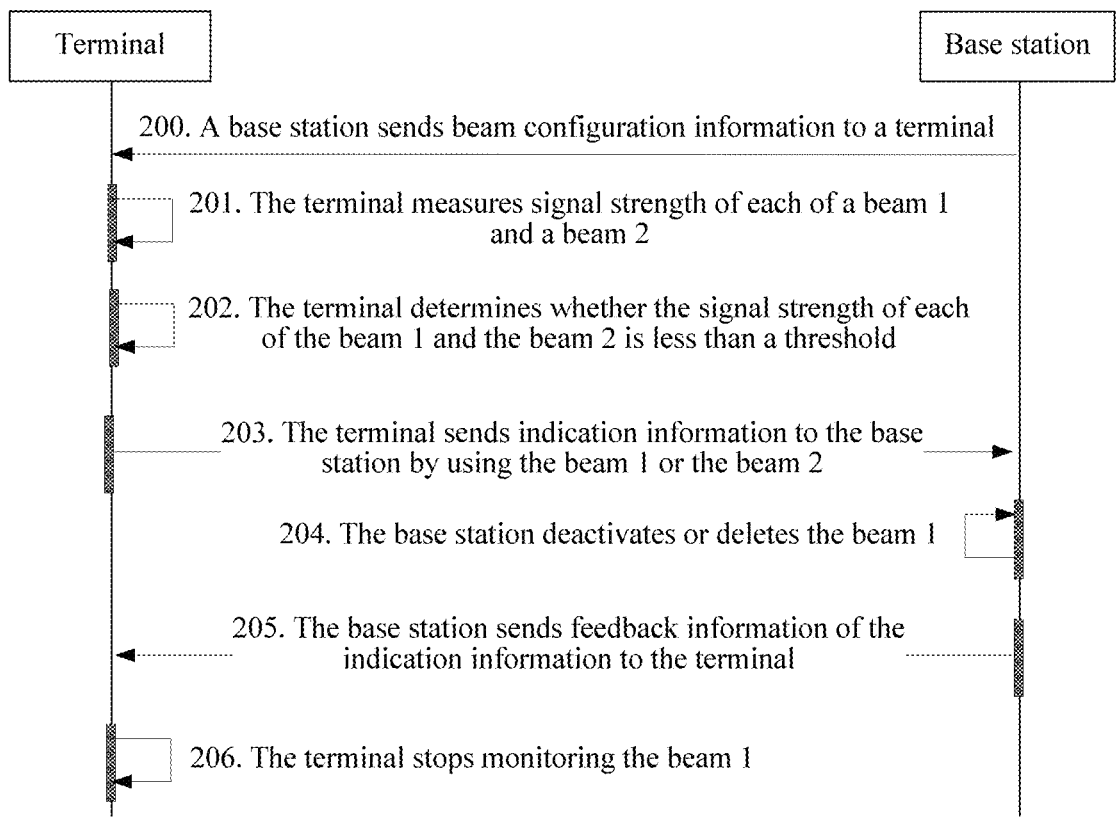
FIG. 16 is a flowchart of a radio resource selection method according to an embodiment of this application.

The solution in the foregoing first design manner is described below by using an example with reference to FIG. 16. As shown in FIG. 16, the solution includes the following steps.

Step 200: The base station sends beam configuration information to the terminal.

The beam configuration information is used to instruct the terminal to communicate with the base station by using a beam 1 and a beam 2.

Step 201: The terminal measures signal strength of each of a beam 1 and a beam 2.

The terminal separately measures the signal strength of the beam 1 and the beam 2, to determine whether a communication quality requirement is met.

Step 202: The terminal determines whether the signal strength of each of the beam 1 and the beam 2 is less than a threshold.

If the signal strength of the beam 1 is less than the threshold and the signal strength of the beam 2 is not less than the threshold, the terminal may determine that signal quality of the beam 1 is poorer, and if the terminal continues to communicate with the base station by using the beam 1, normal communication between the terminal and the base station may be affected.

Step 203: The terminal sends indication information to the base station by using the beam 1 or the beam 2.

The indication information is used to instruct the base station to delete or deactivate the beam 1, and the indication information may be deactivation indication information or deletion indication information. In addition, the indication information may include identifier information of the beam 1, or the signal strength of the beam 1, or a CQI=0.

The terminal may send first indication information to the base station by using a MAC layer or an RRC layer. The first indication information may include deactivation indication information or deletion indication information. The deactivation indication information or the deletion indication information is used to instruct the base station to deactivate or delete the beam 1. The first indication information may further include a CQI of the beam 1. For example, the CQI=0 is used by the terminal to indicate, to the base station, that the signal quality of the beam 1 is no longer suitable for continuing to perform data transmission, so that the base station deactivates or deletes the beam 1. Optionally, the first indication information may further include at least one of an identifier of the beam 1, an antenna port identifier of the beam 1, a reference signal of the beam 1, or other identifier information. In this way, when receiving the first indication information sent by the terminal, the base station deactivates or deletes the beam 1 by using the deactivation indication information or the deletion indication information in the first indication information, or the deactivation indication information or the deletion indication information and the identifier information of the beam 1 included in the first indication information, to avoid affecting normal communication between the terminal and the base station when data is transmitted by still using the beam 1 having poor signal quality.

Step 204: The base station deactivates or deletes the beam 1.

After receiving the first indication information sent by the terminal, the base station deactivates or deletes the beam 1. During communication with the base station, the terminal deactivates or deletes the beam that does not meet the communication quality requirement, so that if signals of beams for communication between the terminal and the base station suddenly attenuate, a problem of a waste of network resources that is caused when communication is still performed by using the beams can be avoided, and a problem of a great increase in power consumption that is caused when the terminal still performs communication by using the beams having relatively low communication quality can further be avoided.

Step 205: The base station sends feedback information of first indication information to the terminal.

The feedback information is used to instruct the terminal to stop monitoring the beam 1. Because the base station stops communicating with the terminal by using the beam 1, a problem such as a waste of resources that is caused because the terminal keeps on monitoring the beam 1 is avoided. The feedback information may carry the identifier information of the beam 1, and the identifier information of the beam 1 includes at least one of the identifier of the beam 1, the antenna port identifier of the beam 1, the reference signal of the beam 1, or other identifier information.

Step 206: The terminal stops monitoring the beam 1.

After receiving the feedback information of the first indication information that is sent by the base station, the terminal may stop monitoring the beam 1.

After the terminal sends the first indication information to the base station, the base station may deactivate or delete the beam 1 that does not meet the communication quality requirement, to be specific, the base station may stop communicating with the terminal by using the beam 1. After sending the first indication information to the base station, the terminal may stop monitoring the beam 1. In addition, after receiving the feedback information of the first indication information that is sent by the base station, the terminal may stop monitoring the beam 1. In this way, if the base station is subject to external interference, or the like, once the base station does not receive the first indication information sent by the terminal and continues to send data to the terminal by using the beam 1, a problem of a data loss that is caused because the terminal prematurely stops monitoring the beam 1 can be avoided.

In a second design manner in an embodiment provided in this application, during movement of the terminal, communication quality of a deactivate beam or a new beam may meet a communication quality requirement. To apply the beam that meets the communication requirement to communication between the terminal and the base station, to improve quality of communication between the terminal and the base station, in another embodiment provided in this application, the terminal may activate or add the beam that meets the communication quality.

In the design manner, the terminal may obtain a measurement result of a beam. The terminal may obtain measurement results of one or more beams. The one or more beams are deactivate beams or non-configured beams for the terminal. For example, the measurement result may include a measurement result of beam signal quality or a measurement result of a beam path loss.

For the terminal, a non-configured beam means that the terminal stores no related information of the beam.

For a state of a beam, refer to the foregoing first design manner, and details are not described herein again.

The terminal may learn, in a plurality of manners, of a beam whose measurement result needs to be obtained: The terminal may determine the beam based on configuration information configured and sent by the base station, or the terminal may voluntarily perform blind detection on the beam. The terminal may obtain the measurement result in a plurality of manners. Refer to related content in the first design manner, and details are not described herein again.

After obtaining the measurement results of the one or more beams, the terminal may determine whether the measurement result of each of the one or more beams satisfies a second quality condition, to be specific, determine whether the beam meets the communication quality requirement. The second quality condition is a condition used to determine whether a beam satisfies the communication quality requirement, and a beam satisfying the second quality condition may be considered as a beam satisfying the communication quality requirement. For example, the second quality condition may be that signal quality is greater than a threshold, or signal quality is greater than a threshold within a period of time, or a quantity of times that signal quality is greater than a threshold is greater than a preset quantity of times. For another example, the second quality condition may be that a beam path loss is less than a threshold, or a beam path loss is less than a threshold within a period of time, or a quantity of times that a beam path loss is less than a threshold within a period of time is greater than a preset quantity of times. Content of the second quality condition may be formulated as required, and the content of the second quality condition is not limited in this application. The second quality condition may be sent by the base station to the terminal or may be specified in a communication standard. The second quality condition may also be implicitly indicated. For example, if it is specified in a standard that the quality requirement is not met if signal strength is less than or equal to a threshold A, it may be considered that it implicitly indicates that the second quality condition is that signal strength is greater than the threshold A.

After determining one or more beams meeting the communication quality requirement, the terminal may send second indication information to the base station. The second indication information is used to instruct to activate or add the one or more beams meeting the communication quality requirement. Optionally, the terminal may send the second indication information to the base station by using a beam other than the target beam. Optionally, the terminal may send the second indication information to a network device (such as the base station) by using a macro base station or a low-frequency network. For example, the terminal may send the second indication information to the base station by using a MAC layer or an RRC layer.

Optionally, before sending the second indication information to the base station, the terminal may actively activate or add the one or more beams meeting the communication quality requirement, for possible data transmission.

The second quality condition may be sent by the base station to the terminal, or may be specified in a communication standard.

Optionally, whether a beam meets the communication quality requirement may be determined by determining a quantity of NACKs received on the beam. In other words, the first quality condition and the second quality condition may use a quantity of NACKs as a determining basis. For example, the first quality condition may be that the quantity of NACKs is greater than a first threshold, and the second quality condition may be that the quantity of NACKs is less than a second threshold. Information identifying the one or more beams meeting the communication quality requirement may be used as the second indication information or a part of the second indication information. The information identifying the one or more beams meeting the communication quality requirement may be identifiers of the one or more beams meeting the communication quality requirement, antenna port identifiers corresponding to the one or more beams meeting the communication quality requirement, reference signals corresponding to the one or more beams meeting the communication quality requirement, or the like. Optionally, the second indication information may further include activation indication information or addition indication information. The activation or addition indication information may be represented by using a bit.

Optionally, after sending the second indication information to the base station, the terminal may monitor the one or more beams meeting the communication quality requirement, so that when the base station transmits data to the terminal by using the one or more beams meeting the communication quality requirement, the terminal may obtain, in time, the data sent by the base station on the one or more beams meeting the communication quality requirement. Optionally, after receiving feedback information of the second indication information that is sent by the base station, the terminal may start to monitor the one or more beams meeting the communication quality requirement. The feedback information may carry the identifier information of the activated or added beam, and the identifier information of the beam includes at least one of an identifier of the beam, an antenna port identifier of the beam, or a reference signal of the beam, or other identifier information. For example, the second indication information instructs to activate or add a beam 3 and a beam 4. The feedback information of the base station indicates that the beam 4 can be activated, and after receiving the feedback information, the terminal may monitor data communication on the beam 4.

After the base station receives the second indication information sent by the terminal, the base station may activate or add, based on the second indication information, the one or more beams meeting the communication quality requirement, or the base station may activate or add, based on the second indication information, some of the one or more beams meeting the communication quality requirement. The base station may communicate with the terminal based on the one or more activated or added beams meeting the communication quality requirement.

Optionally, the second indication information sent by the terminal to the base station may further include channel state information (CSI) of the one or more beams meeting the communication quality requirement, or other information that can reflect communication quality. After receiving the foregoing information, the base station may select a relatively good beam to perform an activation or addition operation.

It should be noted that, the solution in which the terminal sends the second indication information to the base station may be combined with the solution in which the terminal sends the first indication information to the base station.

The first indication information or the second indication information is sent in a plurality of manners. For example, the first indication information or the second indication information is sent by using MAC layer signaling or RRC layer signaling. For another example, the first indication information or the second indication information is sent by using beam control signaling or beam management signaling.

In a variant of the solutions in the foregoing two design manners, the base station may obtain a measurement result of a beam, and send first indication information or second indication information to the terminal, to instruct the terminal to deactivate/delete, or activate/add the beam. For specific content, refer to the foregoing two design manners, and it only needs to replace the terminal in the foregoing two design manners with the base station, and replace the base station with the terminal, and details are not described herein again.

Optionally, in a scenario in which an uplink transmission link and a downlink transmission link for communication between the terminal and the base station have no symmetry (namely, no respiratory), the terminal may implement the solutions in the foregoing two design manners for a downlink beam, and the base station may implement the solutions in the foregoing two design manners for an uplink beam.

For ease of description, in this embodiment of this application, an example in which a network device is a base station is used for description. For example, the base station may be a base station having a 4G or 5G communication function, but this embodiment of this application is not limited thereto.

Figure 17:
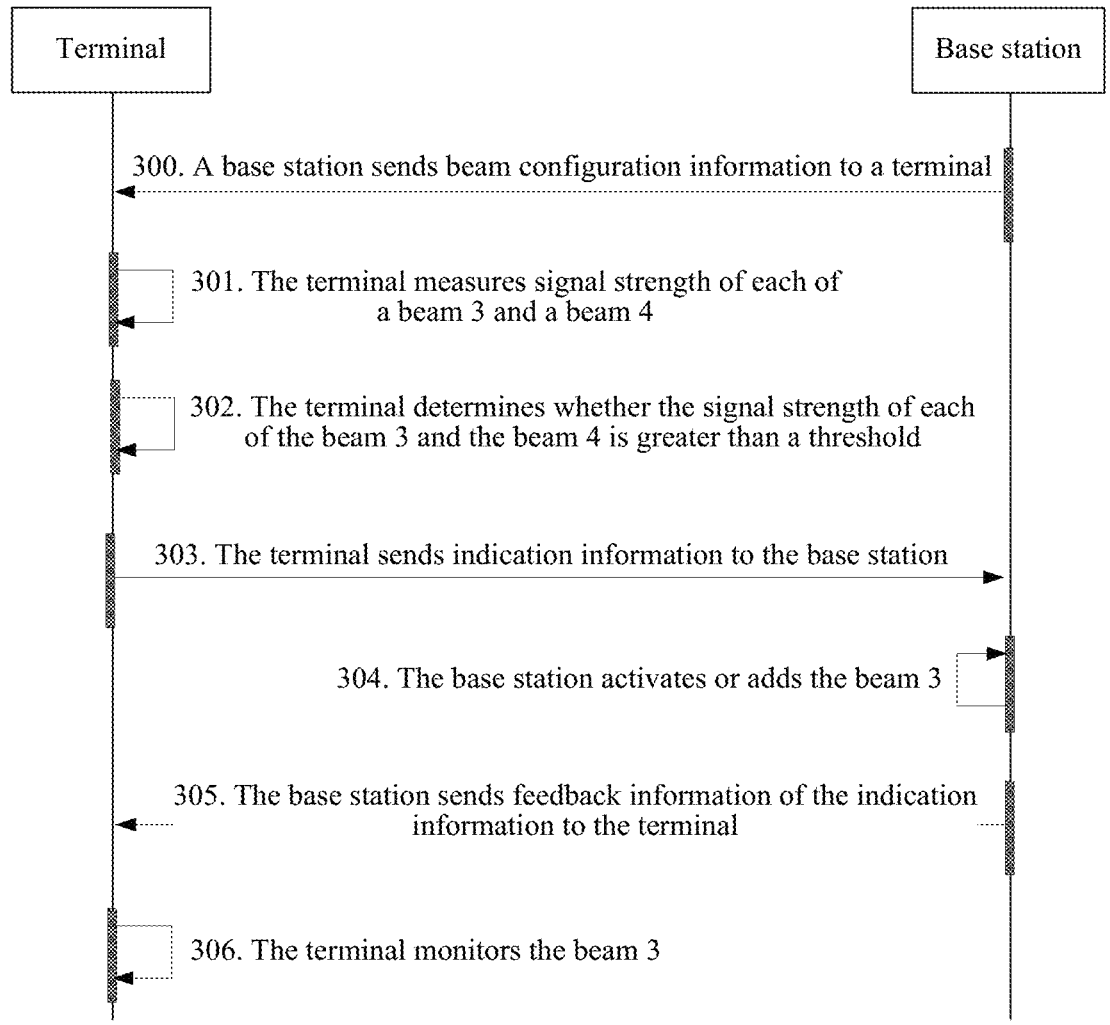
FIG. 17 is a flowchart of a radio resource selection method according to another embodiment of this application.

The solution in the foregoing second design manner is described below by using an example with reference to FIG. 17. As shown in FIG. 17, the solution includes the following steps.

Step 300: The base station sends beam configuration information to the terminal.

The beam configuration information is used to instruct the terminal to determine whether a beam 3 and a beam 4 meet a communication quality requirement.

Step 301: The terminal measures signal strength of each of a beam 3 and a beam 4. The terminal may measure the signal strength of, for example, the beam 3 and the beam 4 for communication between the terminal and the base station, to obtain the signal strength of each of the beam 3 and the beam 4. The beam 3 and the beam 4 may be beams not configured by the base station for the terminal for use or are deactivate beams for the terminal.

Step 302: The terminal determines whether the signal strength of each of the beam 3 and the beam 4 is greater than a threshold.

If the terminal determines that the signal strength of the beam 3 is greater than the threshold, but the signal strength of the beam 4 is less than the threshold, the terminal may determine that the signal strength of the beam 3 can meet a requirement of communication between the terminal and the base station.

Step 303: The terminal sends second indication information to the base station.

The second indication information is used to instruct the base station to activate the beam 3 or add the beam 3 for communication with the terminal.

The terminal may send the second indication information to the network device by using a beam other than the beam 3. The second indication information may include an identifier of the beam 3, or includes an antenna port identifier for transmitting the beam 3, or a reference signal of the beam 3, or other information that can be used to identify the beam. Optionally, the second indication information may further include activation indication information or addition indication information. In this way, when receiving the second indication information sent by the terminal, the base station activates the beam 3 or adds the beam 3 for the terminal, to improve quality of communication between the terminal and the network device. Adding the beam 3 for the terminal means that the beam 3 is configured for the terminal for use.

Step 304: The base station activates or adds the beam 3.

After receiving the second indication information sent by the terminal, the base station may activate or add the beam 3, and subsequently, the base station may communicate with the terminal by using the beam. Because the beam 3 has relatively good communication quality, efficiency of communication between the terminal and the base station is effectively improved.

Step 305: The base station sends feedback information of the second indication information to the terminal.

After the base station activates or adds the beam 3, to enable the terminal to monitor the beam 3 in time, the base station sends the feedback information of the second indication information to the terminal. The feedback information may carry identifier information of the beam 3, and the identifier information of the beam 3 includes at least one of the identifier of the beam 3, the antenna port identifier of the beam 3, the reference signal of the beam 3, or other identifier information.

Step 306: The terminal monitors the beam 3.

After receiving the feedback information of the indication information that is sent by the base station, the terminal may monitor the beam 3, to receive data that is sent by the base station by using the beam 3.

Optionally, after sending the indication information to the base station, the terminal may voluntarily monitor the beam 3, without waiting for the feedback information of the indication information from the base station.

Figure 18:
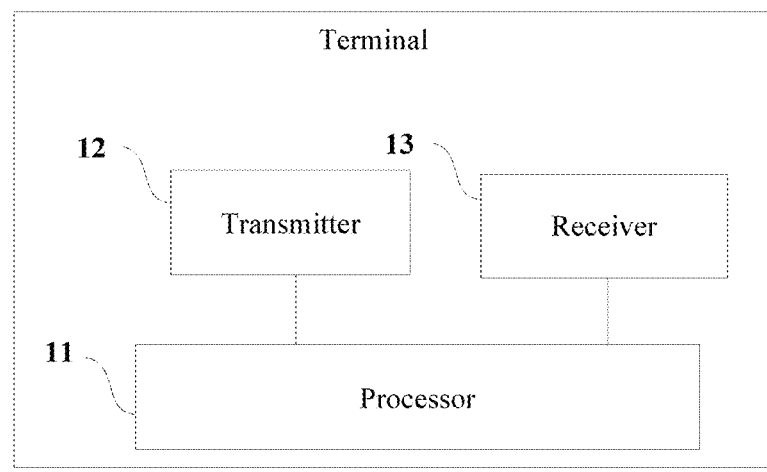
FIG. 18 is a schematic diagram of a terminal according to an embodiment of this application.

As shown in FIG. 18, an embodiment of this application further provides a terminal, configured to implement the solution on a terminal side in the foregoing first design manner. The terminal includes: a processor 11, a transmitter 12, and a receiver 13. The processor 11 is configured to obtain a measurement result of a beam. For specific content of obtaining the measurement result of the beam, refer to the content in the first design manner in the foregoing embodiment.

The transmitter 12 is configured to send first indication information to a network device, where the first indication information is used to instruct to deactivate or delete the beam, and a measurement result of the beam satisfies a first quality condition.

For descriptions of sending the first indication information to the network device, specifically, refer to related content in the first design manner in the foregoing embodiment, and details are not described herein again.

Optionally, the transmitter 12 is specifically configured to send the first indication information by using the beam.

Optionally, the transmitter 12 is specifically configured to send first indication information by using a low-frequency network.

Optionally, the transmitter 12 is specifically configured to send the first indication information to the network device by using the beam or a beam other than the beam.

For example, the first indication information may include deactivation indication information or deletion indication information. For example, the first indication information may include quality information of the beam.

For example, the first indication information may include identifier information of the beam.

For related content of the first indication information, refer to the content in the first design manner.

Optionally, the processor 11 is further configured to stop monitoring the beam.

Optionally, the receiver 13 is further configured to receive feedback information of the first indication information from the network device.

For a running mechanism of the terminal, specifically, refer to the content in the foregoing first design manner, and content related to FIG. 16, and details are not described herein again.

According to the terminal provided in this embodiment of this application, the terminal instructs the network device to deactivate or delete a beam that does not meet a communication quality requirement, to avoid a case in which normal communication between the terminal and the network device is affected because communication quality of the beam does not meet a requirement.

Figure 19:
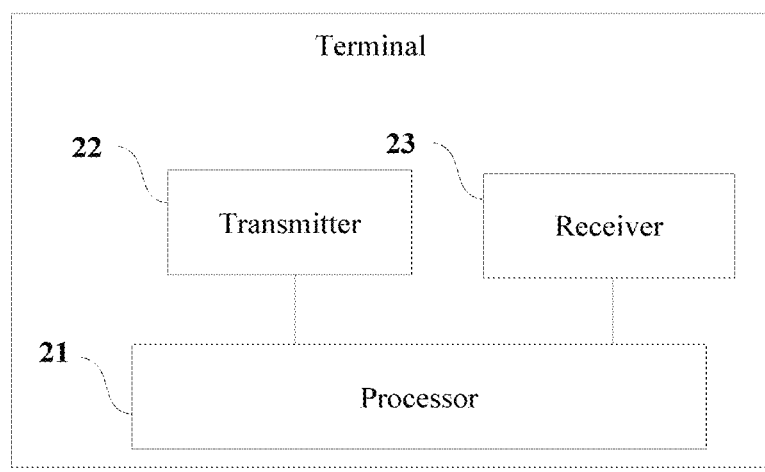
FIG. 19 is a schematic diagram of a terminal according to another embodiment of this application.

As shown in FIG. 19, an embodiment of this application further provides a terminal, configured to implement a function of the terminal in the second design manner in the foregoing embodiment. The terminal includes: a processor 21, a transmitter 22, and a receiver 23. The processor 21 is configured to obtain a measurement result of a beam. The transmitter 22 is configured to send second indication information to a network device, where the second indication information is used to instruct to activate or add the beam, and the measurement result of the beam satisfies a second quality condition.

For descriptions of the foregoing functions of the processor 21 and the transmitter 22, specifically, refer to the content in the second design manner in the foregoing embodiment, and details are not described herein again.

Optionally, the transmitter 22 is specifically configured to send the second indication information to the network device by using a beam other than the beam.

Optionally, the transmitter 22 is specifically configured to send the second indication information to the network device by using a low-frequency network.

The second indication information includes identifier information of the beam.

Optionally, the second indication information may further include: activation indication information or addition indication information, or quality information of the beam.

Optionally, the processor 21 is further configured to monitor the beam.

Optionally, the receiver 23 is further configured to receive feedback information of the second indication information from the network device.

For a specific running mechanism of the terminal, refer to the content in the foregoing second design manner, and refer to FIG. 17 and the corresponding example.

Figure 20:
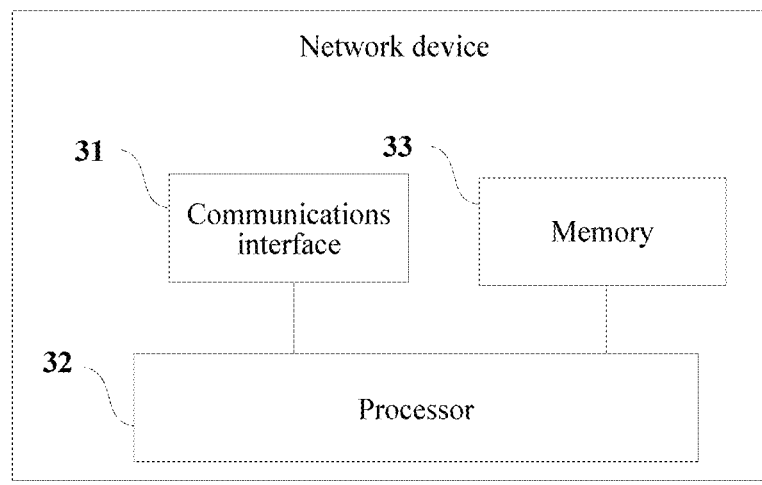
FIG. 20 is a schematic diagram of a network device according to an embodiment of this application.

As shown in FIG. 20, an embodiment of this application further provides a network device, configured to implement a function of a network side provided in the first design manner in the foregoing embodiment. The network device includes: a communications interface 31 and a processor 32. The communications interface 31 is configured to receive first indication information sent by a terminal, where the first indication information is used to instruct to deactivate or delete a beam. The processor 32 is configured to deactivate or delete the beam.

Optionally, the network device may further include a memory 33, configured to store an executable instruction, so that after the processor 32 runs the instruction, the foregoing function of the network device can be implemented.

For a running mechanism of the network device, specifically, refer to the content in the foregoing first design manner and the example corresponding to FIG. 16.

Figure 21:
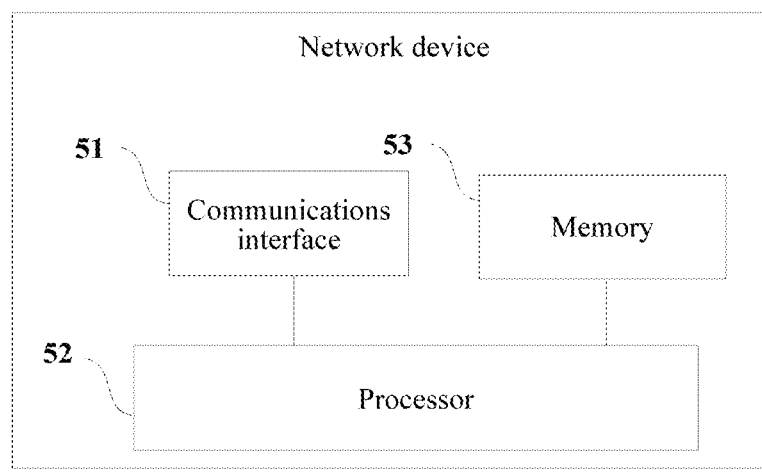
FIG. 21 is a schematic diagram of a network device according to another embodiment of this application.

As shown in FIG. 21, an embodiment of this application further provides a network device, configured to implement the method performed on a network device side in the second design manner in the foregoing embodiment. The network device includes: a communications interface 51 and a processor 52. The communications interface 51 is configured to receive second indication information sent by a terminal, where the second indication information is used to instruct to activate or add a beam. The processor 52 is configured to activate or add the beam.

Optionally, the network device may further include a memory 53, configured to store an executable instruction, so that after the processor 52 runs the instruction, the foregoing function is implemented.

For a running mechanism of the network device, specifically, refer to the content in the foregoing second design manner, and refer to FIG. 17 and the corresponding example, and details are not described herein again.

It should be noted that, a beam in the embodiments of this application is a spatial resource for performing communication by using a high-frequency signal, and for the radio resource selection method and the apparatus provided in the embodiments of this application, a solution applicable to another spatial resource can be obtained by simply replacing a beam in the embodiments of this application with another spatial resource.

A person skilled in the art should learn that, the network device provided in the embodiments of this application may be a base station. With development of technologies, a base station may have another name.

It may be understood that this application is applicable to environments or configurations of a plurality of universal or dedicated computing systems, for example, a personal computer, a server computer, a handheld device or a portable device, a flat panel device, a multi-processor system, a microprocessor-based system, a set-top box, a programmable consumer digital device, a network PC, a minicomputer, a mainframe computer, or a distributed computing environment including any one of the foregoing systems or devices.

This application can be described in the general context of computer executable instructions executed by a computer, for example, a program module. Generally, the program unit includes a routine, program, object, component, data structure, and the like for executing a particular task or implementing a particular abstract data type. This application may be practiced in distributed computing environments in which tasks are performed by remote processing devices that are connected through a communications network. In a distributed computing environment, program modules may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or any other variant are intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

A person skilled in the art can easily figure out another implementation solution of this application after considering the specification and practicing this application that is disclosed herein. This application is intended to cover any variation, use, or adaptive change of this application. These variations, uses, or adaptive changes follow the general principles of this application and include common general knowledge or common technical means in the art that are not disclosed in this application. The specification and the embodiments are merely considered as examples, and the actual scope and the spirit of this application are pointed out by the following claims.

It should be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. A method comprising:
    obtaining, by a terminal, first measurement configuration information;
    obtaining, by the terminal, a plurality of beam reference signals from one or more base stations;
    measuring, by the terminal, the plurality of beam reference signals according to the first measurement configuration information, to obtain measurement values of the plurality of beam reference signals; and
    performing, by the terminal, filtering on the measurement values of the plurality of beam reference signals, to obtain a measurement result, wherein the measurement result comprises a cell measurement result or a beam measurement result, the cell measurement result indicating a measurement of a cell associated with a base station of the one or more base stations, and the beam measurement result indicating a measurement of a beam in which a beam reference signal is sent; and
    wherein the performing, by the terminal, the filtering on the measurement values of the plurality of beam reference signals comprises:
        obtaining, by the terminal, measurement values of sets of beam reference signals in the plurality of beam reference signals, the sets of beam reference signals being received within a preset time range, each set of beam reference signals being received at a same moment;
        averaging, by the terminal, measurement values of each set of beam reference signals, to obtain an average measurement value of a corresponding set of beam reference signals; and
        processing, by the terminal in a preset manner, average measurement values of the respective sets of beam reference signals within the preset time range, to obtain a first measurement result, and using the first measurement result as the cell measurement result.

2. The method according to claim 1, wherein the terminal obtains the measurement result of the plurality of beam reference signals in a same cell or different cells; and
    the cell measurement result comprises a serving cell measurement result or a neighboring cell measurement result.

3. The method according to claim 1, further comprising:
    obtaining, by the terminal, second measurement configuration information;
    determining, by the terminal, a beam reference signal measurement set from the plurality of beam reference signals based on the second measurement configuration information, the beam reference signal measurement set comprising one or more beam reference signals; and
    measuring, by the terminal, a beam reference signal in the beam reference signal measurement set, to determine whether to select the beam reference signal into a beam reference signal active set based on the second measurement configuration information, the beam reference signal active set comprising one or more beam reference signals.

4. The method according to claim 3, wherein the second measurement configuration information comprises a first preset threshold; and
    measuring, by the terminal, the beam reference signal in the beam reference signal measurement set, to determine whether to select the beam reference signal into the beam reference signal active set comprises:
        measuring, by the terminal, the beam reference signal in the beam reference signal measurement set within a first preset period, to obtain a measurement result within the first preset period; and
        selecting, by the terminal, the beam reference signal into the beam reference signal active set when the measurement result within the first preset period is greater than the first preset threshold.

5. The method according to claim 3, wherein the second measurement configuration information comprises a second preset threshold; and the method further comprises:
    measuring, by the terminal, a beam reference signal in the beam reference signal active set within a second preset period, to obtain a measurement result within the second preset period; and
    selecting, by the terminal, the beam reference signal as a target beam reference signal when the measurement result within the second preset period is greater than the second preset threshold.

6. The method according to claim 5, further comprising:
performing, by the terminal within a third preset time range, radio link monitoring (RLM) on a target beam on which the target beam reference signal is transmitted; and
when the target beam reference signal satisfies a radio link failure (RLF) condition, triggering, by the terminal, a Radio Resource Control connection re-establishment process.

7. The method according to claim 5, further comprising:
when a measurement result of the target beam reference signal is less than a third preset threshold, selecting, by the terminal, a beam, on which a first beam reference signal in the beam reference signal active set other than the target beam reference signal is transmitted, to perform RLM on the selected beam; and
when the target beam reference signal and the first beam reference signal other than the target beam reference signal both satisfy an RLF condition, triggering, by the terminal, a Radio Resource Control connection re-establishment process; or
performing, by the terminal, RLM on all beam reference signals in the beam reference signal active set; and
when all beams in the beam reference signal active set satisfy the RLF condition, triggering, by the terminal, the Radio Resource Control connection re-establishment process.

8. The method according to claim 1, wherein the preset manner comprises averaging or finding a maximum value.

9. An apparatus, comprising:
at least one communications interface; and
at least one processor connected with the at least one communications interface;
wherein the processor is configured to:
obtain first measurement configuration information;
obtain a plurality of beam reference signals sent by one or more base stations;
measure the plurality of beam reference signals according to the first measurement configuration information, to obtain measurement values of the plurality of beam reference signals; and
perform filtering on the measurement values of the plurality of beam reference signals, to obtain a measurement result, wherein the measurement result comprise a cell measurement result or a beam measurement result, the cell measurement result indicating a measurement of a cell associated with a base station of the one or more base stations, and the beam measurement result indicating a measurement of a beam in which a beam reference signal is sent; and
wherein the processor is further configured to:
obtain, measurement values of sets of beam reference signals in the plurality of beam reference signals, the sets of beam reference signals being received within a preset time range, and each set of beam reference signals being received at a same moment;
average measurement values of each set of beam reference signals, to obtain an average measurement value of a corresponding set of beam reference signals; and
process, in a preset manner, average measurement values of the respective sets of beam reference signals within the preset time range, to obtain a first measurement result, and using the first measurement result as the cell measurement result.

10. The apparatus according to claim 9, wherein the apparatus obtains the measurement result of the plurality of beam reference signals in a same cell or different cells; and
the cell measurement result comprises a serving cell measurement result or a neighboring cell measurement result.

11. The apparatus according to claim 9, wherein the processor is further configured to:
obtain second measurement configuration information;
determine a beam reference signal measurement set from the plurality of beam reference signals based on the second measurement configuration information, the beam reference signal measurement set comprising one or more beam reference signals; and
measure a beam reference signal in the beam reference signal measurement set, to determine whether to select the beam reference signal into a beam reference signal active set based on the second measurement configuration information, the beam reference signal active set comprising one or more beam reference signals.

12. The apparatus according to claim 11, wherein the second measurement configuration information comprises a first preset threshold; and
the processor is further configured to:
measure the beam reference signal in the beam reference signal measurement set within a first preset period, to obtain a measurement result within the first preset period; and
select the beam reference signal into the beam reference signal active set when the measurement result within the first preset period is greater than the first preset threshold.

13. The apparatus according to claim 11, wherein the second measurement configuration information comprises a second preset threshold; and the processor is further configured to:
measure a beam reference signal in the beam reference signal active set within a second preset period, to obtain a measurement result within the second preset period; and
select the beam reference signal as a target beam reference signal when the measurement result within the second preset period is greater than the second preset threshold.

14. The apparatus according to claim 9, wherein the preset manner comprises averaging or finding a maximum value.

15. A communications system, comprising at least one base station and at least one terminal, wherein the terminal is configured to: obtain first measurement configuration information, obtain a plurality of beam reference signals sent by one or more base stations, measure the plurality of beam reference signals according to the first measurement configuration information, to obtain measurement values of the plurality of beam reference signals, and perform filtering on the measurement values of the plurality of beam reference signals, to obtain a measurement result, wherein the measurement result comprises a cell measurement result or a beam measurement result, the cell measurement result indicating a measurement of a cell associated with a base station of the one or more base stations, and the beam measurement result indicating a measurement of a beam in which a beam reference signal is sent; and the base station is configured to receive the measurement result from the terminals; and wherein the terminal is configured to perform filtering on the measurement values of the plurality of beam reference signals by:

obtaining, measurement values of sets of beam reference signals in the plurality of beam reference signals, the sets of beam reference signals being received within a preset time range, each set of beam reference signals being received at a same time moment;

averaging measurement values of each set of beam reference signals, to obtain an average measurement value of a corresponding set of beam reference signals; and processing, in a preset manner, average measurement values of the respective sets of beam reference signals within the preset time range, to obtain a first measurement result, and using the first measurement result as the cell measurement result.

16. The system according to claim 15, wherein the preset manner comprises averaging or finding a maximum value.

* * * * *